(12) United States Patent
Wierowski

(10) Patent No.: US 7,334,190 B2
(45) Date of Patent: Feb. 19, 2008

(54) INTERACTIVE VIDEO TOUR SYSTEM EDITOR

(75) Inventor: James V. Wierowski, Rochester, NY (US)

(73) Assignee: MJW Corporation Inc., Amherst, NY (US)

( * ) Notice: Subject to any disclaimer, the term of this patent is extended or adjusted under 35 U.S.C. 154(b) by 753 days.

(21) Appl. No.: 10/608,761

(22) Filed: Jun. 27, 2003

(65) Prior Publication Data

US 2004/0056883 A1    Mar. 25, 2004

Related U.S. Application Data

(60) Provisional application No. 60/391,960, filed on Jun. 27, 2002.

(51) Int. Cl.
*G05F 3/00* (2006.01)
(52) U.S. Cl. .................................... 715/712
(58) Field of Classification Search ................. 715/712
See application file for complete search history.

(56) References Cited

U.S. PATENT DOCUMENTS

| | | | |
|---|---|---|---|
| 6,121,966 A | 9/2000 | Teodosio et al. | |
| 6,388,688 B1 * | 5/2002 | Schileru-Key | 715/854 |
| 6,397,143 B1 * | 5/2002 | Peschke | 701/208 |
| 6,400,401 B1 | 6/2002 | Morino et al. | |
| 6,496,206 B1 * | 12/2002 | Mernyk et al. | 715/835 |
| 6,577,714 B1 * | 6/2003 | Darcie et al. | 379/93.17 |
| 6,985,902 B2 * | 1/2006 | Wise et al. | 707/10 |
| 6,995,778 B2 * | 2/2006 | Noble et al. | 345/632 |

2002/0163547 A1 * 11/2002 Abramson et al. .......... 345/855

FOREIGN PATENT DOCUMENTS

| | | |
|---|---|---|
| WO | WO 97 31482 A | 8/1997 |
| WO | WO 00 60440 A | 10/2000 |

OTHER PUBLICATIONS

Shearer, "The Vistors Guide: A Simple Video Reuse Application," International Journal of Pattern Recognition and Artificial Intelligence, vol. 11, No. 2, Mar. 1997, pp. 275-301 XP008022666, Singapore.

* cited by examiner

*Primary Examiner*—Kristine Kincaid
*Assistant Examiner*—Le Nguyen
(74) *Attorney, Agent, or Firm*—Kirkpatrick & Lockhart Preston Gates Ellis LLP

(57) ABSTRACT

A computer system, method, and apparatus for editing an interactive image video tour. The system may include a computer including an image editor for providing a visual program interface for editing an interactive image video tour; a database in communication with the computer containing data associated with a plurality of images comprising a portion of the interactive image video tour; and a viewer in communication with the computer for displaying the plurality of images. The method may include selecting a data file that includes image data and displaying an image associated therewith on a computer, the data file being stored in an image database containing a plurality of images for creating an interactive image video tour; and modifying one aspect of the image data contained in the selected data file. The apparatus may include a computer-readable medium containing instructions for controlling a computer system to perform a method for editing an interactive image video tour.

6 Claims, 15 Drawing Sheets

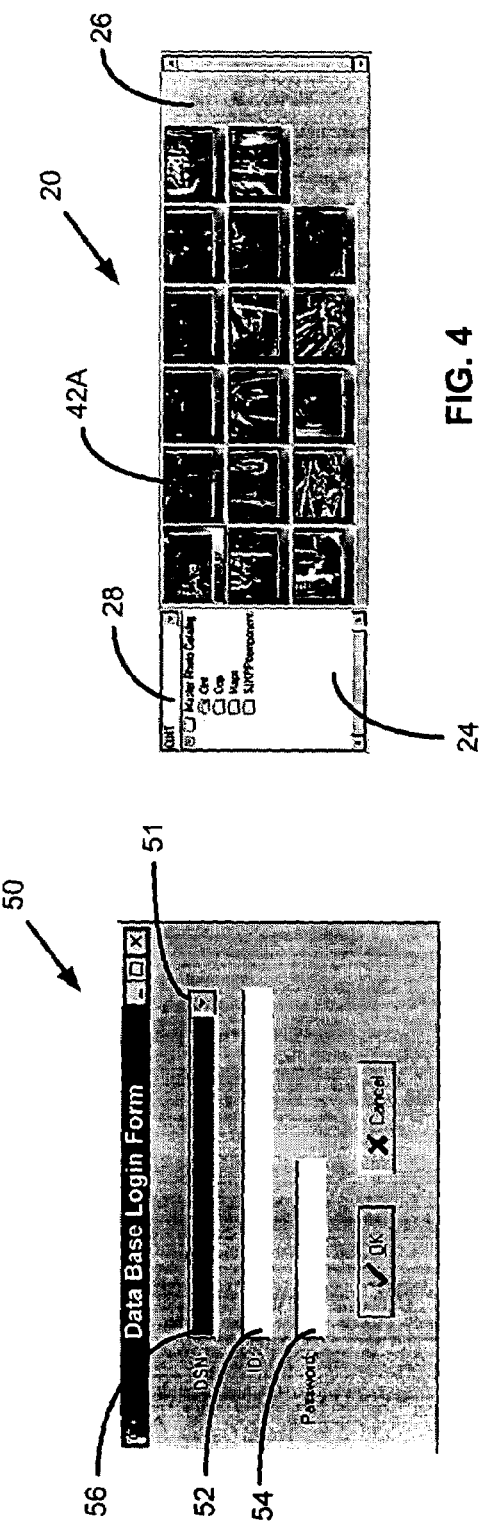
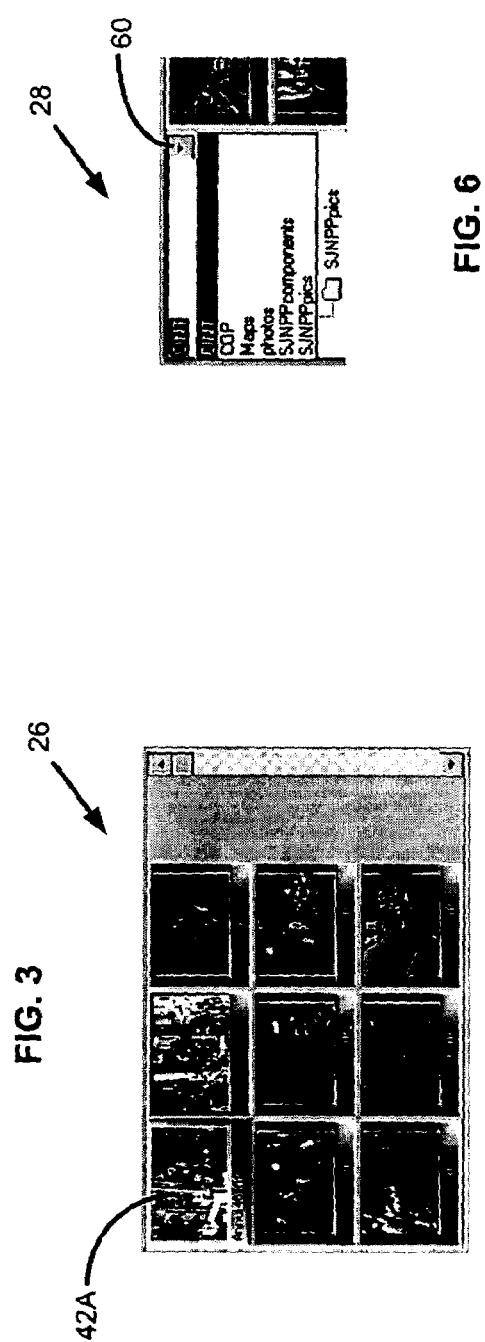
FIG. 4
FIG. 6
FIG. 3
FIG. 5

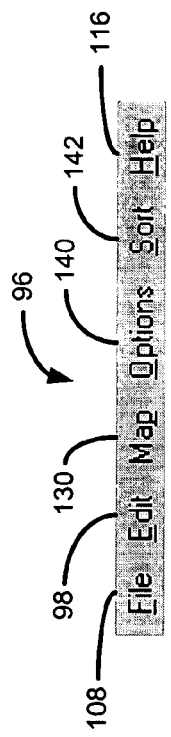
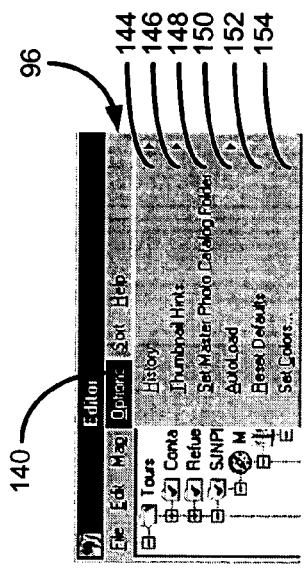
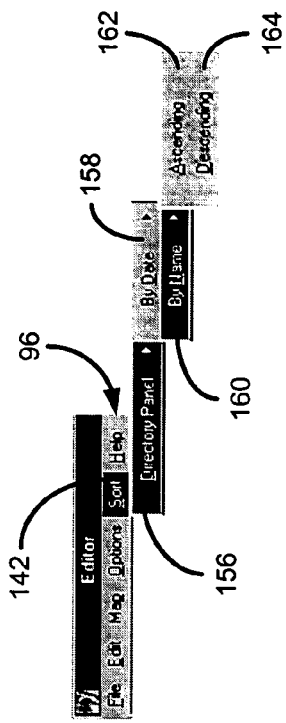
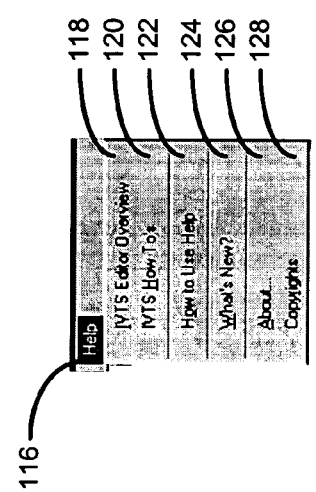
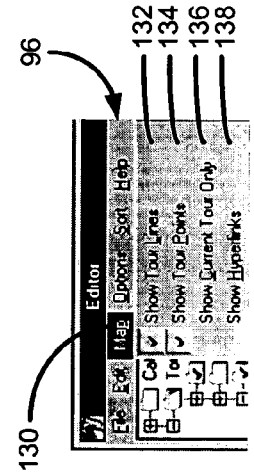
FIG. 17
FIG. 18
FIG. 19
FIG. 20
FIG. 21
FIG. 22

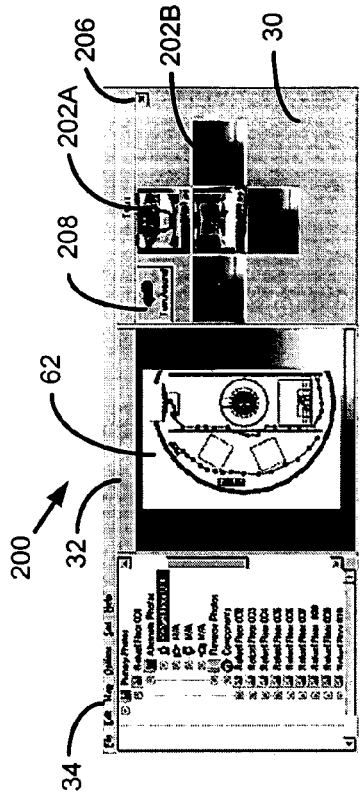
FIG. 28
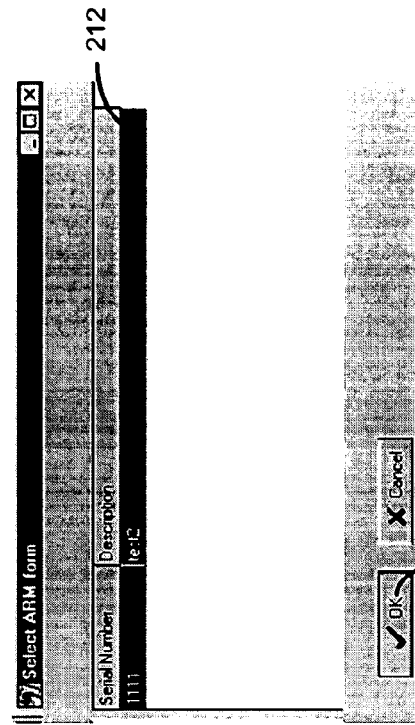
FIG. 29
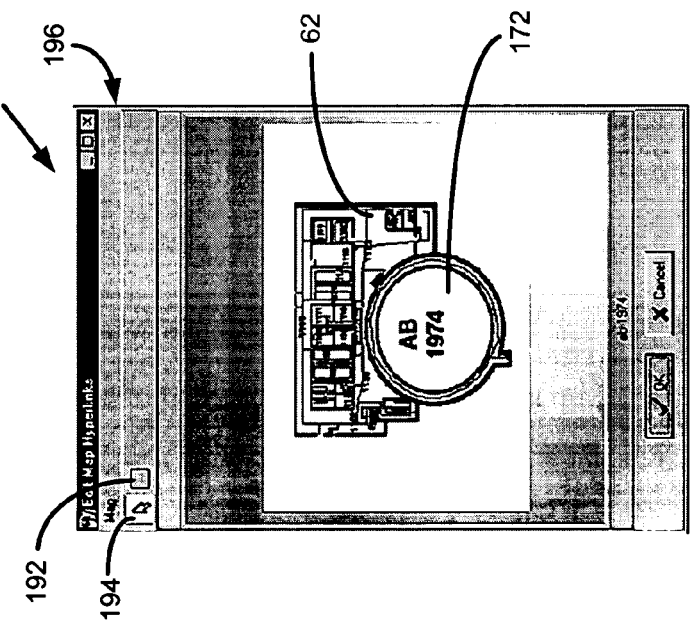
FIG. 26
FIG. 27

INTERACTIVE VIDEO TOUR SYSTEM EDITOR

CROSS REFERENCE TO RELATED APPLICATIONS

This application claims the benefit under 35 U.S.C. § 119(e) to U.S. Provisional Application No. 60/391,960, filed Jun. 27, 2002.

BACKGROUND

1. Technical Field

The invention relates generally to editors for creating and editing software applications and more specifically to editors for creating and editing software applications for interactive image video tours.

2. Description of the Related Art

Image video tour software applications provide users with image video tours of a predetermined facility using a software program that converts a series of digitized images gathered in and around the facility into a virtual image video tour of the facility. Such image video tours have been created, for example, for nuclear power plants, schools and other facilities. There are circumstances under which emergency personnel, rescuers, police units, and the like, need to familiarize themselves with a particular facility. Video tour editors provide such personnel with a way to view a virtual tour of a facility on a computer monitor before entering a potentially dangerous environment in or around the facility.

There exists software for creating and editing image video tour editors for use with image video tour viewer software programs. Such editors provide an easy-to-use, visual interface for creating image video tours that can be viewed with the viewer. Such editors also can be used for adding or replacing existing pictures in tours that have already been created. Tour photos and maps are placed in specified directories. Tours are created by dragging and dropping thumbnails (small versions of each picture) of the photos and maps from the specified directories into a viewer, adding descriptions, and placing locational arrows on the maps. Components and related information, for example electronic dosimeters, telemetric dosimeters, Area Radiation Monitors (hereinafter "ARM"), and Continuous Air Monitors (hereinafter "CAM") overlays also may be combined with the images to form a portion of a video tour.

Related art image video tour editors, however, lack various features for creating and editing more sophisticated image video tours. For example, related art image video tours lack application programming interfaces (API), including a Dynamic Linked Library (DLL) that provides access for other programs to various functions within an editor. These functions include, for example, providing tour lines on various maps associated with the tours, tour points on the maps, hyperlinks on the maps, coordinating arrow positions with a primary photo, auto position and rotation of arrows for alternate photos, site plans, notes associated with components, and component searching capability. Therefore, there is a need in the art for an interactive image video tour program that can provide one or more of these features, among others, for creating and editing interactive image video tours.

SUMMARY

According to one aspect, an embodiment of the invention provides a computer system for editing an interactive image video tour. The system includes a computer including the image editor providing a visual program interface for editing an interactive image video tour associated with a predetermined facility; a database in communication with the computer containing data associated with a plurality of images associated with the predetermined facility comprising a portion of the interactive image video tour; and a viewer in communication with the computer for displaying the plurality of images of the predetermined facility for enabling a user to view a virtual interactive tour of the predetermined facility.

Another aspect of an embodiment of the invention provides a method of editing portions of an interactive image video tour. The method includes displaying a thumbnail view of an image associated with a predetermined facility in a first portion of the image editor, the image being stored in a database in the form of a data file comprising image data; selecting the thumbnail view of the image; transferring the selected thumbnail view of the image to a second portion of the image editor; and positioning the selected thumbnail view of the image in a predetermined order according to a tour layout plan of the predetermined facility within the second portion of the image editor, the predetermined order corresponding to a position of the image within the tour layout of an interactive image video tour of the predetermined facility.

A further aspect of an embodiment of the invention provides a method of creating and editing portions of an interactive image video tour. The method includes transferring a data file stored in an image database to a memory of a computer, the image database containing a plurality of data files representing a plurality of images associated with an interactive image video tour of a predetermined facility, each of the plurality of data files comprising image data for displaying an image associated with a portion of the predetermined facility on a viewer associated with the computer; displaying a thumbnail view of the image in a first portion of the image editor; dragging the thumbnail view of the image from the first portion of the image editor to a second portion of the image editor; positioning the thumbnail view of the image in a predetermined position according to a tour layout plan of the predetermined facility in the second portion of the image editor; and displaying in the second portion of the image editor the image selected for use in the interactive image video tour of the predetermined facility.

Still another aspect of an embodiment of the invention provides a method of editing portions of an interactive image video tour. The method includes selecting a data file comprising image data and displaying an image associated therewith on a display monitor of a computer, the data file being stored in an image database containing a plurality of images for creating an interactive image video tour of a predetermined facility; and modifying one aspect of the image data contained in the selected data file.

Still a further aspect of an embodiment of the invention provides a computer-readable medium containing instructions for controlling a computer system to perform a method for editing an interactive image video tour. The method includes transferring a data file stored in an image database to a memory of a computer, the image database containing a plurality of data files representing a plurality of images associated with an interactive image video tour of a predetermined facility, each of the pluralities of data files comprising image data for displaying an image associated with a portion of the predetermined facility on a viewer associated with the computer; displaying a thumbnail view of the image in a first portion of the image editor; dragging the thumbnail view of the image from the first portion of the image editor to a second portion of the image editor; positioning the thumbnail view of the image in a predetermined position according to a tour layout plan of the predetermined facility in the second portion of the image editor; and displaying in the second portion of the image editor the image selected for use in the interactive image video tour of the predetermined facility.

Yet another aspect of an embodiment of the invention provides a computer-readable medium containing instructions for controlling a computer system to perform a method for editing an interactive image video tour. The method includes selecting a data file comprising image data and displaying an image associated therewith on a computer, the data file being stored in an image database containing a plurality of images for creating an interactive image video tour of a predetermined facility; and modifying one aspect of the image data contained in the selected data file.

These and various other aspects of the invention are pointed out with particularity in the claims annexed hereto and forming a part hereof. For a better understanding of the invention, however, reference should be made to the drawings which form a further part hereof, and to the accompanying descriptive matter, in which there illustrated and described specific examples of a system and method in accordance with the invention.

BRIEF DESCRIPTION OF DRAWINGS

The embodiments of the present invention may be better understood by referring to the following description taken in conjunction with the accompanying drawings, in which:

FIG. 3 illustrates one embodiment of a database login screen;

FIG. 4 illustrates one embodiment of a directory panel structure of an editor;

FIG. 5 illustrates one embodiment of a directory thumbnail viewer as a window containing a thumbnail image;

FIG. 6 illustrates one embodiment of a drop-down combo box containing a directory history list;

FIG. 17 illustrates one embodiment of a menu bar;

FIG. 18 illustrates one embodiment of a file menu option of the menu bar of FIG. 17;

FIG. 19 illustrates one embodiment of a help menu option of the menu bar of FIG. 17;

FIG. 20 illustrates one embodiment of a map menu option of the menu bar of FIG. 17;

FIG. 21 illustrates one embodiment of an options menu option of the menu bar of FIG. 17;

FIG. 22 illustrates one embodiment of a sort menu option of the menu bar of FIG. 17;

FIG. 26 illustrates one embodiment of an expand tour tree displaying a maps node;

FIG. 27 illustrates one embodiment of an edit map hyperlinks window;

FIG. 28 illustrates one embodiment of a tour thumbnail viewer screen displaying an alternate image set up;

FIG. 29 illustrates one embodiment of a select ARM form screen;

DESCRIPTION

Figure 1:
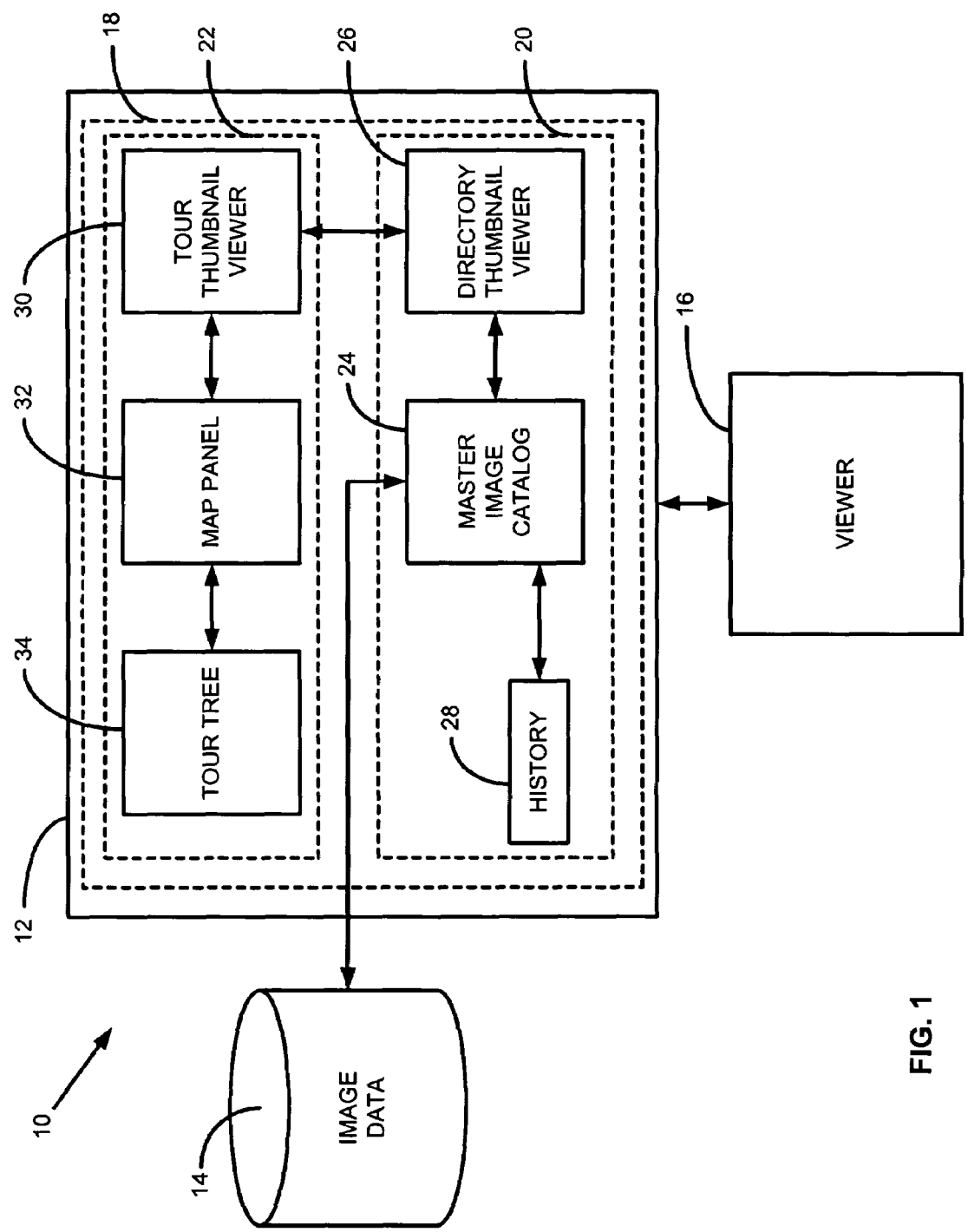
FIG. 1 illustrates one embodiment of a general-purpose computer system for implementing one embodiment of the invention.

One embodiment of the invention provides an Interactive Video Tour System (IVTS) editor that utilizes multimedia technology executing on a general-purpose computer platform. The system enables a user to take an interactive tour of any predetermined facility, such as the containment area of a nuclear power plant, for example. Those skilled in the art will appreciate that although several embodiments of the present invention are described in conjunction with containment areas of a nuclear power plant, the present invention is not limited thereto and may be used in conjunction with any physical area or facility that can be imaged and digitized. Using the IVTS according to one embodiment of the present invention, the user may move in various directions, expand the picture and copy to the WINDOWS® Clipboard. The user also may view any individual component directly by selecting from a list. When desired, a full color copy of the image being viewed may be printed.

Accordingly, planners are able to see areas and components within a facility where work will be conducted without having to leave their office by touring the facility in virtual mode. The physical location, size, orientation, and presence of interfering components may be ascertained without physically entering the facility. Furthermore, the image tour may provide a way of reviewing preferred access and egress routes into and out of the facility. Also, known hot spots, high radiation areas, and ALARA waiting areas in nuclear power plant facilities may be reviewed without entering dangerous portions of the nuclear power plant facility. The image system also may be used during pre-work training sessions to familiarize workers with a facility's layout, and staging of supplies and materials. Reviewing normal and shutdown views of critical areas with the workers also may improve communications and training effectiveness.

One embodiment of the system according to the present invention uses, for example, a standard personal computer workstation with images of the facilities stored in digital format. Because all images are stored in digital format, updating the images may easily be performed at any time. Savings are thus realized in terms of decreased radiation exposure, decreased personal contamination incidents, and time spent entering and exiting restricted areas of a nuclear plant facility.

Various embodiments of the editor according to the present invention provides a user interface which: is intuitive, friendly and easy to use, requires little computer skill or knowledge to operate; enables the user to select and view individual facility (e.g., plant) components; provides unlimited views of each component; provides interface capabilities to the existing facility component databases to allow direct read access to component specifications, work history, etc.; enables the user to take a tour of a selected building or area within the building; stores images in digital format and on industry-standard computer storage media; utilizes digital image processing technology to provide high quality image storage and display to all users on a network, without using laser disk or special display adapter hardware in the end-user's PC; maintains a catalog of all digitized images of components and areas of a facility in a relational database to provide for quick and easy search and retrieval of images; links each image to a reference map showing the location where the image was captured and the direction the camera was facing, giving the user a continuous point of reference; operates on a standard WINDOWS® operating system and on industry-standard networks.

One embodiment of the editor according to the present invention provides a WINDOWS® compliant graphical program and may be interacted with via touch screen or a mouse. Generally, all functions may be performed through menu bar selections and various buttons on the screen. The user generally may, but need not type commands via a keyboard as other user interfaces such as mouse, touch screen, voice recognition, and other user input interfaces may be used to direct an interactive visual tour. The interface may be dynamic in that as the user moves through an area, the "Up", "Down", "Left", and "Right" arrows light up to indicate that an image is available for viewing. Help may be provided continuously via a status bar at the bottom of the screen.

In one embodiment of the present invention, components linked to a displayed picture may be accessed via a "Components" button. Individual components also may be displayed from a similar interface screen that contains controls for selecting components for view.

One embodiment of the present invention may provide two interfaces for end users. A Tour Interface allows users to select an area of the facility and virtually "walk around" that area of the facility. A Component View interface allows users to locate and view individual components at random. Provisions may be provided for entering and identifying a component or selecting a component from various lists.

In one embodiment, the present invention also may provide a reference map generally located in proximity of the viewing window on the display monitor, for example, the reference map may be located to the right of the viewing window. A variety of map formats may be supported such as ".BMP," ".PCX," ".WMF," etc. The map may indicate, for example, a compass direction, a location of the image on a floor plan, and a direction of view. Each image cataloged in the editor may contain an associated map to provide the user with a way of always being aware of their personal virtual location and the direction they are facing in a facility.

The images used with the various embodiments of the editor described herein may originate from a variety of sources and may be stored in a variety of formats. In one embodiment of the present invention, the editor also may facilitate the cataloging of a variety of multimedia type files. For example, the editor may facilitate the cataloging of images and pictures. Furthermore, the editor may facilitate cataloging of IPIX images, video images, as well as audio clips. The images may originate from a variety of sources such as, for example, a digital camera, a camcorder (or other video tape source), laserdisc, a KODAK photo CD, a scanned set of photographs or slides, and the like, for example. Also, the images may be formatted as ".TIF," ".BMP," ".JPG," ".PCX," ".PNG." ".PCD," ".TGA," and ".FIF" files, and the like, for example.

Database maintenance also may be provided in one embodiment of the invention. For example, the editor according to one embodiment of the invention may include a relational database containing information about each picture or image cataloged in the video tour system. The database may be maintained using a variety of visual tools provided with the program. Each picture and its associated map may be selected from a variety of pop-up lists. The arrow may be positioned on the map via drag-and-drop, for example. Additional information about an image may be either typed in or may be selected from a variety of lists. Facility site staff also may maintain the data contained in the editor images and the database. Accordingly, images may be added, deleted or updated at any time at the facility site or at a location remote from the site, for example.

One embodiment of the present invention may utilize, for example, a database interface for the editor using Open Database Connectivity (ODBC) drivers that allow any of more than 150 relational databases to be used to store the information. For example, well known databases in the art such as ORACLE®, ACCESS®, MS® SQL SERVER® and SYBASE® SQL Server may be used in various embodiments of the present invention. ODBC may provide high performance flexible implementation of the editor. The editor database may be constructed and maintained in an existing database system such as ORACLE®, or any other database program. ODBC also may enable easy interfacing of the editor with an existing facility's (e.g., plant's) component databases. Utilizing the component ID as a key field, the user may call up and view "live" data from a plant component database while viewing pictures associated therewith. ODBC also may enable the editor to be interfaced with a Graphical Electronic Dosimetry Display System (GEDDS™), which manages telemetric dosimetry data. The link between the editor and the GEDDS may allow "real-time" data from ARMs and CAMs to be displayed as overlay objects directly on the pictures within the editor. The GEDDS data may be updated periodically (e.g., once per minute) while the user is using the system.

In one embodiment of the present invention, the editor may operate either in a stand-alone or networked environment. The networked operation of the editor makes it accessible to other users or servers that may be logged into a network site. Administration and maintenance of the system may be easily controlled because all images, pictures, maps, and databases are located and maintained on server(s) connected via a network. While network operation may add complexity to the design of the system, embodiments of the present invention may utilize an image format that allows images to be transported across the network while minimizing the impact on overall network performance. Fractal image compression also may be used to provide both an overall good image quality in a small file size. Using such fractal images thus may result in the overall lowest impact on the network performance. Network database access also includes ODBC and thus may provide high performance access to the server database.

The operating environment of one embodiment of the editor according to the present invention may include a 32-bit WINDOWS® application executing under WINDOWS® 9x, NT® and 2000, for example. In one embodiment, 64 Mbytes of RAM may be used. One embodiment of the editor also may be executed on a variety of IBM® compatible computers including a PENTIUM® processor and super VGA or better graphics capability. Expensive, single-use workstations are generally not required but may be used nevertheless. The images in the editor may be true color format (24-bit, 16 million colors). If the images are in true color format, the PC may include a display adapter capable of displaying at least 32,000 or more colors. The editor may interface with standard WINDOWS® compatible color printers that may be used for printing pictures comprising the video tours. Touch screen displays or touch overlays also may be used for public access applications of the present invention.

One embodiment of the invention provides a viewer portion for displaying a sequence of images comprising a virtual tour of a given facility. This may include specific components and related information, text, ARM, and CAM overlays. The viewer interface allows users to tour ("walk around") a facility by viewing a set of photographs in the form of digitized images of an area within or outside a facility. The images may be sequenced to give the user a sense that they are walking through the area. The user may move forward, backward, and may turn around by clicking directional buttons, using the keys on the keyboard, touchscreen input, voice recognition, or any other form of input recognizable by the computer.

In one embodiment of the present invention, the editor provides a visual system for adding, maintaining and deleting digitized images (e.g., pictures, photographs, and the like) to be used for tours and component views. The images may be selected from thumbnail views that may be arranged by room or area and displayed in reduced size so that multiple images may be viewed simultaneously. Reverse, left, and right images also may be associated with the primary images using the thumbnails. A locator arrow may be placed on the map by dragging and dropping it into position.

One embodiment of the present invention also provides a component image maintenance utility that allows for cataloging of component images within the component database tables. Information such as the system and component IDs, description, area, etc. may be entered using the component image maintenance utility. Unlimited views of each component also may be entered into the component database.

One embodiment of the invention provides a map database maintenance utility that allows for cataloging the reference maps used in the editor. The map database maintenance utility includes, for example: the ability of selecting and touring areas of the facility (manual or automatic); enlarging an image to full screen size; selecting and viewing components, including alternate views of images that have been taken and cataloged; storing all images and maps in digital format; utilizing fractal image compression technology for storage of 24 bit true color images (16 million colors) in compressed files as small as 20,000 bytes; rapidly decompressing images without the use of special decompression adapters; efficiently operating across a network because of small image file size; easily updating of the images as the facility is modified; overwriting old image files to bring the system up to date if a new image is taken from the same perspective as a previous image; executing on a standard PC with WINDOWS® 9x, NT® and 2000; providing a client version for network operation (does not contain the maintenance utility functions); and installing database setup programs.

One embodiment of the present invention also may provide the following options: overlaying of data directly on the images, such as radiological data, component IDs, postings, etc.; interfacing with plant maintenance records system to query and display component data and/or work history data; storing and playing back short video clips; interfacing with a visual survey data system for recalling and displaying radiological survey data for an area; interfacing with a GEDDS to display real-time radiological data from electronic dosimeters or air monitors via radio or hard-wired transmission; enabling the user to take pictures of existing tour systems (Surrogate Tour or C-view) and converting them into another editor format.

Turning now to the drawings, wherein like reference numerals refer to like elements, the various embodiments of the present invention are illustrated as being implemented in a suitable general-purpose computing environment. In one embodiment, although not necessary, the invention may be comprised in the general context of computer executable instructions being executed, for example, by a general-purpose computer. The computer executable instructions may take many forms such as, for example, program modules, routines, programs, objects, components, data structures, and the like, for performing specified tasks or for implementing specific data types. Those skilled in the art will appreciate that the invention may be practiced using a variety of well-known conventional general-purpose computer systems such as, for example, microprocessor or micro-controller-based systems, multiprocessor-based systems, programmable devices, personal computers operating in a stand alone or networked environment (e.g., LAN, WAN, Client-Server, CORBA, Internet, etc.), minicomputers, mainframes, and the like.

The embodiments of the present invention also may be practiced in a distributed computing environment. For example, the invention may be practiced where remotely situated computers or processing devices perform tasks while being linked to each other via one or more communication networks. Those skilled in the art also will appreciate that within a distributed computing environment, the computer executable instructions may reside in both local and remote memory, local and remote storage devices or both or any combination thereof. Although the various embodiments of the present invention may be described as being implemented in a suitable computing environment, computer components of a conventional nature, in form and function, such as microprocessor, memory, storage, bus structure, and the like, may not be described in detail for such conventional computer components are well within the knowledge of those skilled in the art. For a detailed description of a general-purpose computer environment in which the invention may be practiced, however, reference is made to U.S. Pat. No. 6,266,054 to Lawton et al. (11.62-67, col. 3 to 1.26, col. 5 and FIG. 1), which is herein incorporated by reference.

FIG. 1 illustrates a general overview of one embodiment of a system according to the present invention. The system includes a general-purpose computer system 10 for creating and editing an interactive image video tour (tour). The computer system 10 may include a general purpose computing device in the form of a personal computer 12 including a computer software program module editor 18 (editor) for creating and editing a tour and providing a visual interface for creating and editing the tour. The personal computer 12 may be in communication with a database 14 that contains therein data associated with a plurality of images comprising various portions of the tour. The computer 12 also may be in communication with a viewer 16 for displaying the plurality of images associated with the tour that are stored in the database 14.

The editor 18 module of the computer system 10 may include a first portion in the form of a directory panel 20 and a second portion in the form of a tour panel 22. The directory panel 20 may include, for example, a master image catalog 24, a directory thumbnail viewer 26, and a directory history tracker 28. The tour panel 22 portion of the editor 18 also may include, for example, a tour thumbnail viewer 30, a map panel 32, and a tour tree 34. As discussed above, components of the personal computer 12 that are of a general or conventional nature are not shown in order to simplify the discussion of the embodiments of the present invention. The operation of the editor 18 software program and the interaction of its various software module subcomponents within the context of creating and editing a tour or editing images associated with the tour are described below.

Many different types of image files and formats may be used as images within the editor 18, such as, for example all of the following types of files: *.FIF, *.WMF, *.EMF, .BMP, *.PNG, *.PCX, *.JPG; *.JPEG; *.PCD; *.TIF; *.TIFF; *.TGA, may be read, edited, and displayed by the editor 18. In one embodiment of the present invention, the editor 18 may facilitate the cataloging of a variety of multimedia type files. For example, the editor 18 may facilitate the cataloging of images and pictures such as IPIX images, video images, as well as audio clips. Before the editor 18 can use any of the image files, however, they may be placed in the master image catalog 24. The image files may be organized into subdirectories under the master image catalog 24. The master image catalog 24 may be designated or changed within the options 140 (FIG. 17) on the menu bar 96 (FIG. 17). When the directories and subdirectories are organized with the image files and the master image catalog 24 has been selected, the directories and subdirectories may be displayed in the master image catalog 24 portion of the editor 18. The thumbnail images 42 may be invoked, for example, by selecting any of the folders within the directories and subdirectories to display the corresponding thumbnail images 42 within the directory thumbnail viewer 26. Adding images for use in the editor 18 may require placing the image files in existing folders in the master image catalog 24 or creating new directories within the master image catalog 24 and placing the image files in the new directories. They may then be available for use in the editor 18.

Reverse images are the images seen in a tour as if the user were to turn around 180° from a forward facing location. As discussed above, each reverse image also may be linked to a primary image. In order for a completed tour to loop in the viewer 16 (e.g., allow the user to travel on a continuous path, turning around at the end of the forward images, traveling back through the tour in the reverse direction, and then starting over again with the first forward image), each forward image may generally include a corresponding reverse image linked to it. If no reverse image exists, duplicate reverse images may be used, for example. The editor's 18 sample database (which may not necessarily be available to individual users), also may supply an image, which may be inserted wherever no reverse image is available. See the Database Administrator for details.

In one embodiment, the editor 18 may be used to edit images comprising an image tour. Such images may be digitized photographs, pictures, blueprints, and other visual representations of the subject matter to be imaged in the editor 18, for example. The editor 18 may provide a convenient easy-to-use, visual interface for creating the tours, editing the tours as well as editing the images associated with the tours that may be viewed with the viewer 16. The editor 18 also may be used for adding or replacing images within existing tours that have already been created. Tour images and maps 62 (see FIG. 7) may be placed in specified directories associated with the directory panel portion 20 of the editor 18, for example. Tours may be created by dragging and dropping thumbnail views of the images (small versions of each picture) and maps 62 (see FIG. 7) from the directory thumbnail viewer 26 into the tour thumbnail viewer 30, adding descriptions and placing location arrows on the maps 62 (see FIG. 7), for example.

Components and other related information, such as for example electronic dosimeters, telemetric dosimeters, ARM and CAM overlays, also may be included as part of the tours using the editor 18. Components may be cataloged in the editor 18 and may be used in tours or viewed independently of tours using the viewer 16. Cataloged components may usually include more detailed images of the components than the images that are used in a tour. Each component may be comprised of one or more images associated therewith, which may provide different views of the component. A component may be cataloged before it can be used in a tour. If components are associated with images in a tour, they may be accessible when the images are displayed in a tour and are indicated by a locator, which is placed on the image displayed by the editor 18. Components also may be viewed without opening a tour, but they may be cataloged in the editor 18. The user may search for components viewed in this manner, for example, by type, system or ID.

As discussed previously, the subject editor 18 forming one aspect of the present invention may reside within the computer system 12 environment illustrated in FIG. 1 in the form of one or more computer-executable software applications or modules. The editor 18 according to one embodiment of the present invention may be implemented as a computer executable application or module. The computer executable application forming the editor 18 may be started, for example, by invoking, e.g., clicking on either an icon identifying the editor 18 in a start menu or by clicking an executable file associated with the editor 18 in one of the program directories contained within the personal computer 12. Accordingly, when the executable application associated with the editor 18 is invoked, a splash screen may appear on the computer display showing the version of the software program and then one embodiment of a screen associated with the editor 18 is displayed.

Figure 2:
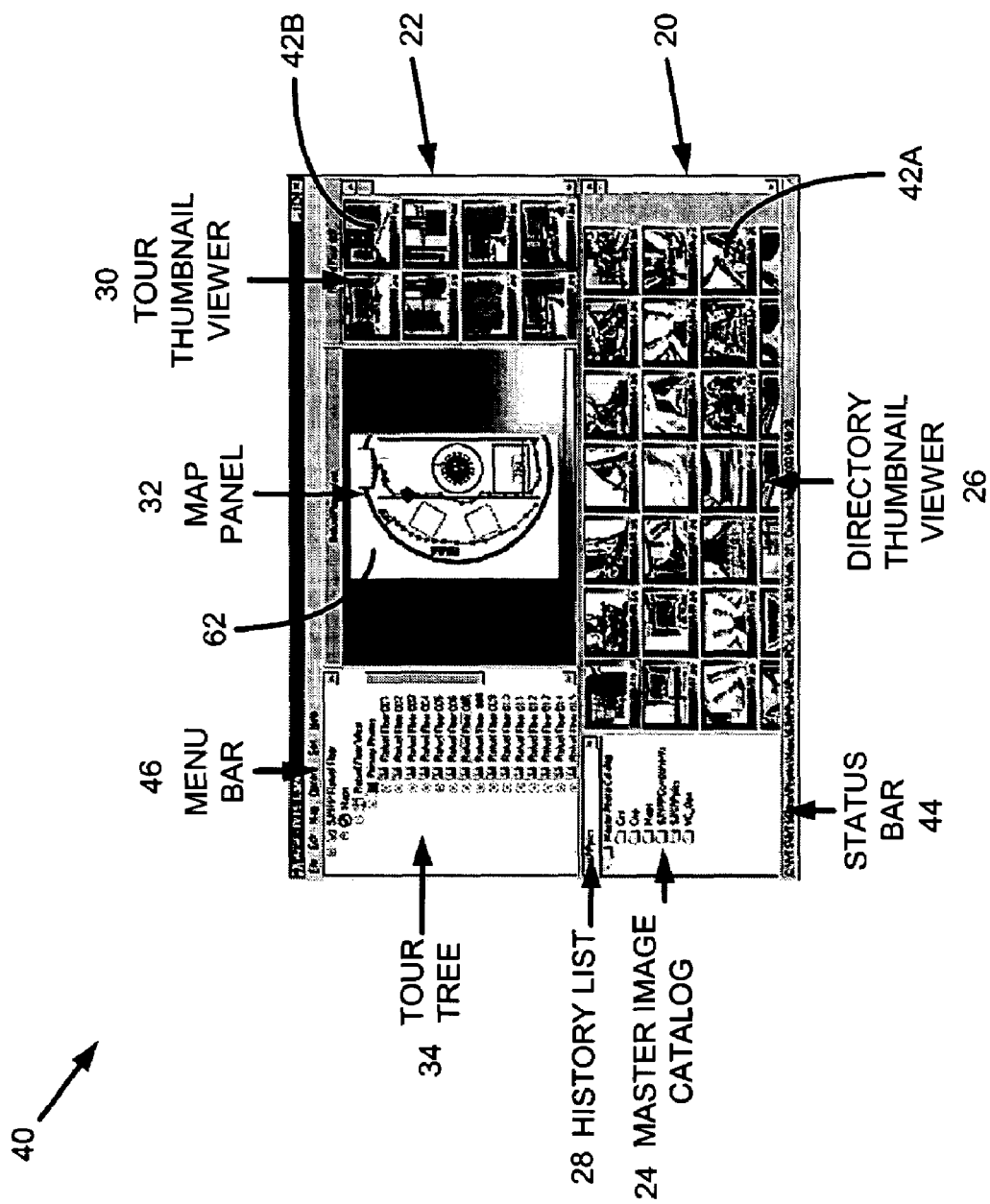
FIG. 2 illustrates one embodiment of a screen associated with one embodiment of the image editor.

FIG. 2 generally illustrates one embodiment of a screen 40 associated with the editor 18. The screen 40 associated with the editor 18 may be divided into several panels and bars. For example, the screen 40 may be divided into a directory panel 20 and a tour panel 22. The directory panel 20 may comprise a master image catalog 24, a directory thumbnail viewer 26, and a directory history list 28, for example. The directory thumbnail viewer 26 may display one or more thumbnail images 42A of the corresponding image files listed in the master image catalog 24. In addition, in one embodiment of the present invention, the editor 18 may comprise a status bar 44 that provides the user with information related to the various image files, location of a mouse on the screen, and the like. The status bar 44 information may change as the mouse is moved over the various portions of the editor 18 and may provide the user with hints about functions that may be available to the user within the editor 18. In addition, the status bar 44 may provide additional information about the various images and maps 62 that may be created and edited with the editor 18. The tour panel 22 may comprise a tour thumbnail viewer 30, a map panel 32, and a tour tree 34. The tour thumbnail viewer 30 also may display one or more thumbnail images 42B of the corresponding image files listed in the master image catalog 24 and the directory thumbnail viewer 26. Hereinafter, once the thumbnail image 42A from the directory thumbnail viewer 26 is placed in the tour thumbnail viewer 30 it will be referred to as thumbnail image 42B. In one embodiment, a menu bar 46 may be provided within the screen 40 that may contain five or more options for the user to choose from, for example, File, Edit, Options, Sort Help, and the like. Those skilled in the art will appreciate that additional or fewer options may be provided within the menu bar 46 depending on the specific implementation of the editor 18 without departing from the scope of the present invention.

The tour tree 34 panel may provide a hierarchical outline view of a given tour. The map panel 32 may contain a map 62 of the tour area. The tour thumbnail viewer panel 30 may contain the one or more thumbnail images 42B selected for a current tour that is being created or edited. The directory thumbnail viewer 26 may display the one or more thumbnail images 42A from a pre-selected directory within the master image catalog panel 24 area of the directory panel portion 20 of the screen 40. The master image catalog panel 24 may contain the directory structure of the images comprising the tours and maps 62 illustrating portions of the tours that are available for display in the directory thumbnail viewer 26. The history list 28, which in one embodiment of the present invention is situated above the master image catalog panel 24 is a drop-down combination box menu, may contain the directory history list of the directories that have been selected during the creation of a tour. All of the panels comprising the editor 18 may be resized for easy viewing, for example, by moving the cursor over the border of a panel and when the cursor changes to a double arrow the panel may be moved to make the panel larger or smaller by holding down the mouse button and dragging the mouse in the desired direction.

There may be three overviews that help explain various aspects of one embodiment of the editor 18 according to the present invention. First, there may be an introduction to the editor 18, which is a basic explanation of one embodiment of the editor 18. Second, there may be an overview that provides a description of the various panels and tools of one embodiment of the editor 18 and the various functions of each panel and tool. Third, there may be a tour overview, which provides a description of the basic components of one embodiment of a tour.

Tours may be created or edited using the editor 18 according to one embodiment of the present invention. Once created, the tours may be viewed with the interactive video tour system viewer 16. Tours may comprise images, maps 62, arrows, and components. The images and maps 62 for the tours may be stored within directories contained in the master image catalog 24. Those skilled in the art will appreciate, however, that the images and maps 62 may be stored elsewhere without departing from the scope of the invention. To create a tour, one or more maps 62 displaying the locations of the various images may be cataloged into the tour. The images may then be selected in the order in which they may be viewed. Descriptive information also may be added to each image. For each image, an arrow may be placed on the map 62 corresponding to the location of the image within the tour.

Primary images may be used to create a forward path and a reverse path within a given tour. Primary images are the main images of a tour that follow a linear progression of an area and may be used to create a forward path in a tour. Reverse images may include any pictures, for example, that the user will see when a Turn Around Button in a tour is clicked. These images may include the pictures the user sees when turned around 180° from an original location, for example. A status bar 44 is provided at the bottom of the viewer 18 to communicate information to the user. As the cursor moves over various objects on the screen 40, the text in the status bar may be updated to provide a description of the object under the cursor and/or instructions regarding the operations that may be performed on the object. In one embodiment of the present invention, tour lines 70 (FIG. 7) and tour points 72 (FIG. 7) may represent the primary images only and the tour lines 70 (FIG. 7) and tour points (FIG. 7) generally will not change if reverse or alternate images are edited or added thereto. In one embodiment of the present invention, if a completed tour is being edited and is concurrently open in the viewer 16, the changes made in the editor 16 may not be seen in the viewer 16 until the viewer program has been exited and restarted.

In one embodiment of the present invention, an alternate image may be defined as any picture, for example, that provides an up, down, left or right view for a given primary image in a tour. Alternate images may be linked to any type of image, except a component image, for example. Primary images, reverse images or even other alternate images, for example, may have one or more alternate images associated therewith. Alternate images may comprise, for example, images normally seen while looking to the left, right, up, and down of the primary image while walking through the area represented by the primary image within the tour. Linking arrows may be placed on an image to allow the user to tour through a new tour linked to the present tour. In one embodiment of the preset invention, a linking arrow may be provided on the image to show that the new tour may be available in the direction of the arrow. Selecting the arrow, for example by clicking the mouse curser on it, may change the current tour to another tour in the direction of the arrow. A label may be added to the link, for example, to describe where the new tour goes.

In one embodiment of the present invention, the tours may be created and maintained easily and efficiently if the images and the maps 62 are organized before starting the tour creating process. In one embodiment of the present invention, organizing the images and the maps 62 comprises storing the images and maps 62 in one common directory. For example, a common directory may be given a custom name such as "Tours" and may be part of the master image catalog 24 portion of the editor 18. In one embodiment of the present invention, the images may be grouped into small, logical subdirectories with easily identifiable names. The maps 62 may be placed in a folder named "Maps," for example. The images may be stored in descriptive folders such as "First Floor—Offices," "First Floor—Access Area," "Basement—Storage," and the like.

Those skilled in the art will appreciate that images comprising the various tours to be created and edited with the editor 18 may be stored, for example, in the image database 14. In one embodiment of the present invention, the database 14 may require a login process. With reference now to FIG. 3, one embodiment of a database login screen 50 is shown such that a user may select an ODBC connection, for example, and filling in the user's ID 52 and Password 54. If a login process is needed, the screen 50 automatically appears when the user starts the editor 18. The first combination box 51 contains all the valid ODBC connections defined in the general-purpose computer 12 environment in which the editor 18 resides. If one entry is not in the list, the user may go to the "Control Panel" for the ODBC and create the necessary entry, for example. The user also may supply both the ODBC connection and the ID/Password combination within an editor initialization file such that the information may be provided automatically without the user being prompted for the information. A conventional text editor such as the MICROSOFT® NOTEPAD® program may be used, for example, to edit the simple initialization file and may be stored within the same directory containing the editor's 18 executable file.

In one embodiment of the present invention, the editor 18 may require an ODBC connection to the database 14. The name of the ODBC distributed system network (DSN) may be entered in the DSN dialog box 56. The name to use may be obtained from an initialization file associated with the editor's 18 executable file. For the editor 18 to use a specific DSN, the editor's 18 initialization file may be edited and the DSN may be changed to a DSN32, for example. Otherwise, an ODBC connection may be created to the database 14 that has a DSN of IVTS32, for example. A setup program for the editor 18 may be used to create the new tables for a given DSN before using the editor 18. Optionally, the setup also may move the tours created in a 16-bit version of the editor 18 into the new tables.

FIG. 4 illustrates one embodiment of the present invention that provides a directory panel 20 structure as shown in the lower half portion of the editor's screen 40. As discussed previously, the directory panel 20 may contain the directory history 28, the master image catalog 24, and the directory thumbnail viewer 26 showing the thumbnail images 42A. FIG. 5 illustrates one embodiment of the directory thumbnail viewer 26 as a window that contains the thumbnail images 42A corresponding to the image files stored in the directory selected within the master image catalog 24 of the editor 18. In one embodiment of the present invention, the directory thumbnail viewer 26 may be located to the right of the master image catalog 24. The thumbnail images 42A in the window of the directory thumbnail viewer 26 may include the images that may be available for the user to create or edit a tour. They correspond to the image files contained in the directory that is selected in the master image catalog 24.

To add an image to a tour the user may use what will be referred to hereinafter as a drag and drop procedure. To drag and drop a thumbnail image 42A, B, the user moves and places the cursor over the thumbnail image 42A in the directory thumbnail viewer 26. To indicate that the thumbnail image 42A may be dragged to another location, the cursor may change from one shape to another, for example the cursor may change from the shape of an arrow to the shape of a hand. By clicking and holding down a mouse button while the curser is positioned over a portion of the thumbnail image 42A, the user may then drag, i.e., move, and drop, i.e., place, the thumbnail image 42A to a desired location in the tour thumbnail viewer 30. As the thumbnail image 42A is dragged into the tour thumbnail viewer 30, a placement bar may be highlighted to indicate the position where the thumbnail image 42A may be dropped to the left of the placement bar. The thumbnail image 42B placed in the tour thumbnail viewer 30 may be placed before or after any other thumbnail image 42B located in the tour thumbnail viewer 30. Thumbnail images 42B that are already located in the tour thumbnail viewer 30 may be repositioned using the same drag and drop procedure described previously. Flyovers (described hereinbelow with respect to FIG. 23) may be displayed while the thumbnail images 42A, B are being dragged.

Turning to FIG. 6, located above the master image catalog 24 may be a drop-down combination box that contains the history list 28. The history list 28 may be displayed when the down arrow 60 is clicked within the history list 28. The history list 28, for example, lists the directories that have been selected while creating or editing the tour.

Figure 7:
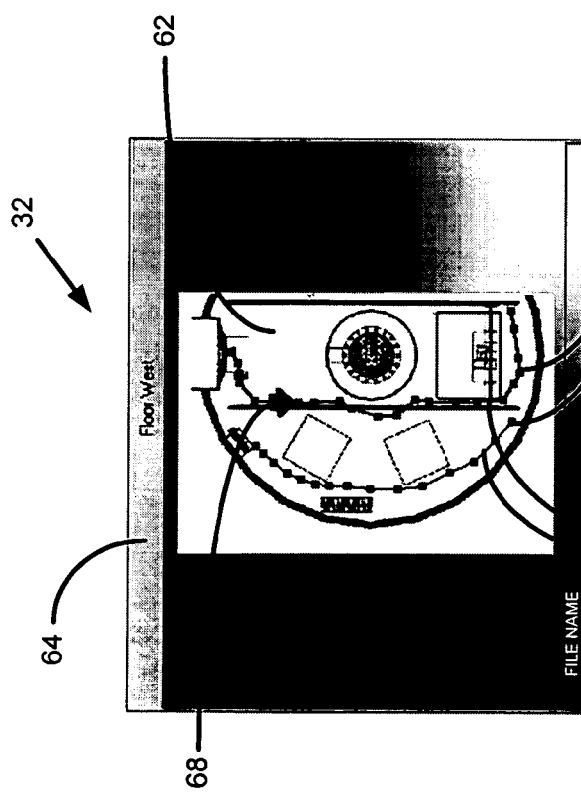
FIG. 7 illustrates one embodiment of a map panel.

FIG. 7 illustrates one embodiment of the map panel 32 according to the present invention. The map panel 32 may display the map 62 that is used to identify the location of the images within the tour, for example. In one embodiment of the present invention the map panel 32 may be located on the screen 40 between the tour tree 34 and the tour thumbnail viewer 30, for example. A description of the map 62 may appear at a top portion 64 of the map panel 32 and the map's file name may appear, for example, at a bottom portion 66 of the map panel 32. An arrow 68, for example a colored arrow, may be provided such that the arrow 68 corresponds to the location of a currently selected thumbnail image 42. The arrow 68 may be moved within the map 62 by clicking on it and dragging the mouse to a desired location. Tour lines 70 and tour points 72 (discussed in more detail below) may automatically readjust when the arrow 68 is moved. The new position may then be saved to the storage or the database 14, for example. The user may rotate the arrow 68 by clicking the right mouse button while the mouse curser is placed over the arrow 68 and selecting the appropriate choices from the pull down menu that is subsequently displayed, for example. There may be provided several options for displaying the tour lines 70 and the points 72, for example, by selecting an option from a menu bar the tour points 70 and tour lines 72 may be hidden or displayed. The color of the tour lines 70 and the tour points 72 also may be set manually or by using predetermined values set in an initialization file, for example.

Arrows 68 may be used for various functions in the editor 18. One function may be, for example, to provide locators on the maps 62. The arrows 68 may be positioned on the maps 62 for identifying the location of the images within a tour. Another function of the arrows 68 is to identify tour links.

These are arrows 68 that may be displayed on the images to indicate the availability of another tour, for example, that the user may link to from the current tour. Clicking on these links may display a second tour that is somehow connected to the current tour. For example, tour links may be set up between any two rooms. Then, as the user tours one room, an arrow may be displayed, that when clicked on or selected, will take the user to the second room that was previously linked with the first room.

Figure 8:
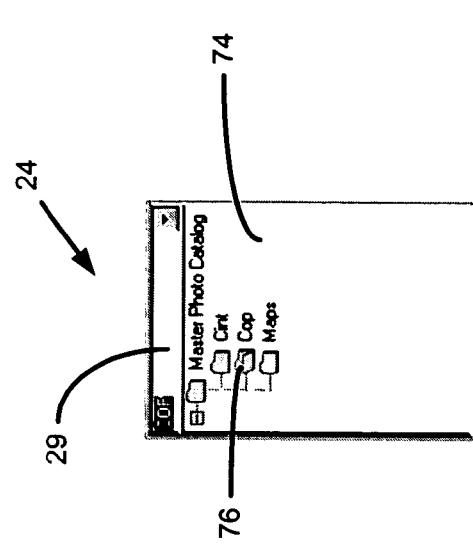
FIG. 8 illustrates one embodiment of a master image catalog.

FIG. 8 illustrates a master image catalog 24 according to one embodiment of the present invention. In one embodiment the master image catalog 24 provides a directory of the map files and the image files available for use in all tours. The master image catalog 24 also may provide a display of an expandable/collapsible hierarchy of folders 74 for organizing the map files and the image files into manageable groups of files. One portion of the master image catalog 24 may provide a drop-down combination box 29 that contains the history list 28, for example. As discussed previously, the drop-down combination box 29 may list the directories that have been selected while creating the tour. Below the history list 28 may be provided the master image catalog 24 of all the image files and map files that are available for the creation of tours. Clicking a plus box within the master image catalog 24 expands a directory to show the various files and subdirectories below it. Double clicking on a subdirectory displays any of the image files contained therein as thumbnail images 42 in the directory thumbnail viewer 26. The open folder icon 76 may indicate the directory of image files that is currently being displayed in the directory thumbnail viewer 26.

All the image files to be used in editing and creating tours may be located in the master image catalog 28 or one of its subfolders (i.e., subdirectories). This feature may be designated, for example, when the editor 18 is first invoked or by clicking on an appropriate option in a given menu bar and then selecting the desired directory. The master image catalog 24 directory may be set up differently for different applications. For example, if desired, the master image catalog 24 may comprise one directory for the development of tours (creating the tours) and another directory for completed tours as long as the appropriate master image catalog 24 is designated by way of options. If a first directory is used for development and a second directory is used for completed tours, upon completion of a tour, the image files used for creating the tours in the first directory should be copied to the second directory so that they will be available to the viewer 16 and thus to the user.

Figure 9:
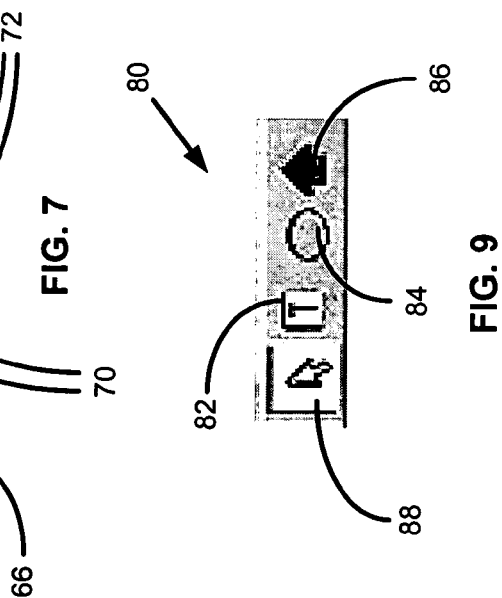
FIG. 9 illustrates one embodiment of an overlay toolbar.

One embodiment of an overlay toolbar 80 according to the present invention is illustrated in FIG. 9. The overlay toolbar 80 may be located in one of several specialized edit screens. For example, the overlay toolbar 80 may be found on the edit primary, alternate, and reverse image information screens. The edit screens may be viewed by right clicking on the name of an image file within the tour tree 34 or by right clicking on the thumbnail image 42B in the tour thumbnail viewer 30 and, in either case, selecting the "Edit" function, for example. The overlay toolbar 80 may include a "T" box 82 for creating a text box on the image that can be edited. This also may be used to display ARM and CAM information. The overlay toolbar 80 also may include a circle 84, which may be colored, for example, as a "locator" and may be used to identify components in a given image. The arrow 86, which also may be colored, for example, may be used in a given image to indicate a link between two separate tours. If the "T" box 82 locator or the arrow 86 is selected, i.e., clicked on, in the toolbox 80, it is "selected" and any subsequent clicking on the image creates that object on the image. Clicking on the pointer cursor 88 returns the user to a "non-select" mode. To select an existing object, (display the handles around it), when no other objects are selected, the user may click on either the "T" box 82 locator or the arrow 86 in the toolbar 80, then click on the object to be selected.

As discussed previously, the image files stored in the master image catalog 24 may generally be viewed in the form of thumbnail images 42A, B in the directory thumbnail viewer 26 and the tour thumbnail viewer 30, respectively. These thumbnail images 42A, B are small representations of the image files and may be displayed in the directory thumbnail viewer 26 and the tour thumbnail viewer 30. The thumbnail images 42A, B may be viewed in greater detail by locating the mouse cursor over the image and clicking the right mouse button while the cursor is on the image and selecting an edit function, for example. For example, right clicking on the thumbnail image 42A in the directory thumbnail viewer 26 displays an option to "Enlarge," which displays the thumbnail image 42A in a separate window that may be created to fill the viewer 16 screen. Furthermore, right clicking on the thumbnail image 42B in the tour thumbnail viewer 30 may display four options. The first option is "Edit" and it displays the Edit Photo Information Form and allows editing of the information about the thumbnail image 42B. The second is "Enlarge" and it displays the thumbnail image 42B in a separate window, which may be made to fill the viewer 16 screen. Third is a "Drill Down" option that changes the focus to an alternate image display. Finally, there is a "Delete" option for removing a selected image from a tour.

Figure 10:
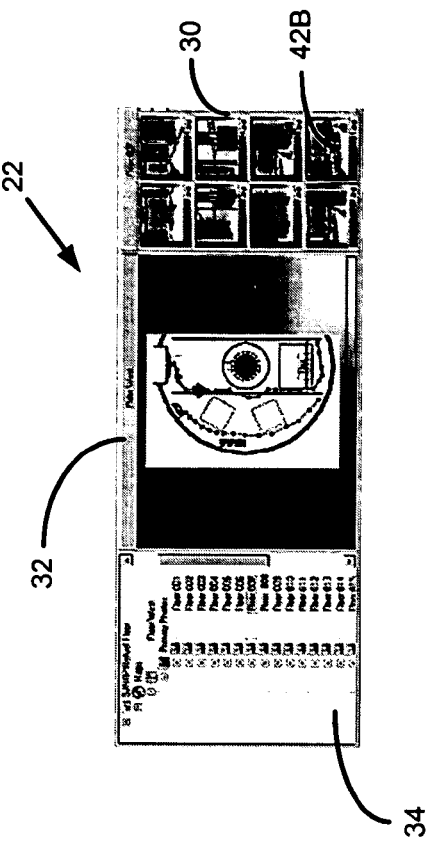
FIG. 10 illustrates one embodiment of a tour panel.

The tour panel 22 may be located in one portion of the editor 18 screen 40 and may be structured as illustrated in FIG. 10, for example. The tour panel 22 may comprise the tour tree 34, the map panel 32, and tour thumbnail viewer 30. The tour panel 22 may contain the elements of a given tour such as the thumbnail images 42B.

Figure 11:
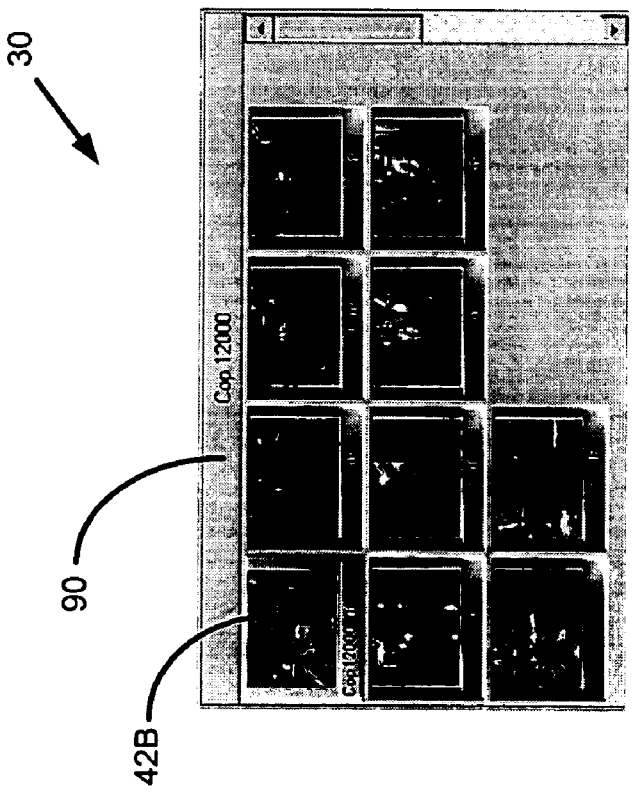
FIG. 11 illustrates one embodiment of a tour thumbnail viewer.

An embodiment of the tour thumbnail viewer 30 of the tour panel 22 is shown in more detail in FIG. 11. The tour thumbnail viewer 30 may display the thumbnail images 42B corresponding to the image files that have been selected for a particular tour and dragged from the directory thumbnail viewer 26 to the tour thumbnail viewer 30. The tour thumbnail viewer 30 may be located to the right of the map panel 32, although it may be located wherever it is most convenient in a given application. The title bar 90 portion of the tour thumbnail viewer 30 may display the description of the currently selected highlighted thumbnail image 42B. Right clicking on the highlighted thumbnail image 42B may provide a menu of options for the selected thumbnail image 42B, including editing the information associated with a given thumbnail image 42B. Thumbnail images 42B may be selected by clicking on them or using arrow keys on a keyboard to move them, for example. Thumbnail images 42B also may be repositioned within the tour thumbnail viewer 30 by using the drag and drop procedure described previously.

Figure 12:
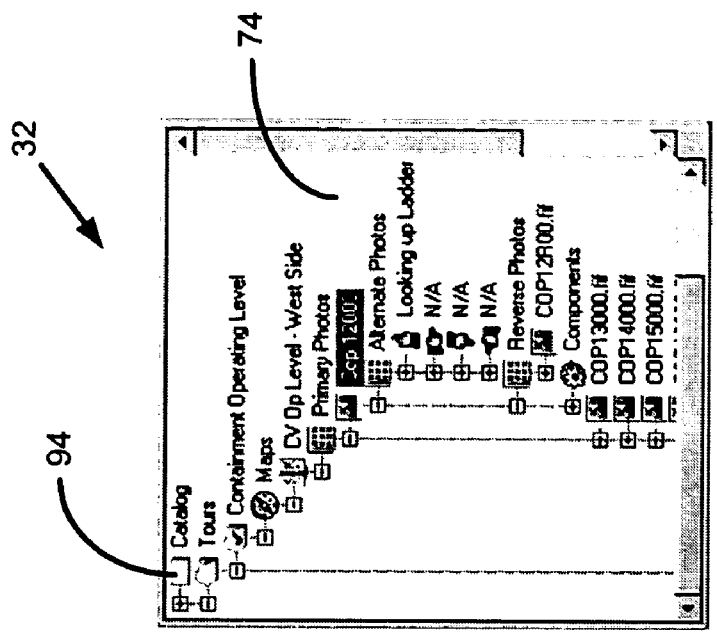
FIG. 12 illustrates one embodiment of a tour tree.

An embodiment of the tour tree 32 is shown in more detail in FIG. 12. The tour tree is a hierarchical outline view of the tour and displays an expandable/collapsible hierarchy of folders 74 for organizing tour files, map files, image files, and component files into manageable groups, for example. Clicking on the plus boxes expands the tour tree 32 and shows more detail (e.g., subdirectories and files contained therein). (A user also may double click on the item to expand the tour tree 32.) The tour tree 32 may display the tour files, associated map files, associated image files, associated component files, and associated component image files.

Folders and objects in the tour tree 32 also may be repositioned by using the drag and drop procedure described previously. To display a tour or view a map 62 or image the user may click on its name in the tour tree 32. Clicking on different items in the tour tree 32 may display different results. Selecting a map file name in the tour tree 32 may display the map 62 in the tour thumbnail viewer 30, for example. Selecting a primary image file in the tour tree 32 may highlight the corresponding thumbnail image 42A in the tour thumbnail viewer 30, for example. Selecting an alternate image file may display the corresponding primary image and the alternate image along with the alternate image options, for example. Selecting a reverse image file may display the corresponding reverse image with the alternate options, for example. Right-clicking on any item may cause a menu to appear with the available options for working with that item, for example. Map files that are cataloged in the tour tree 32 under the catalog folder 94 for use with components may be sorted in alphabetical order, regardless of where they are dragged or dropped into within the tour tree 32.

Figure 15:
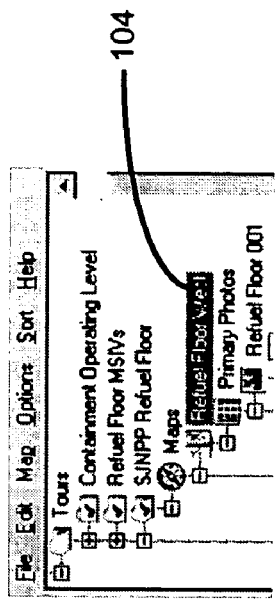
FIG. 15 illustrates one embodiment of an expanded directory tree containing a map node.
Figure 16:
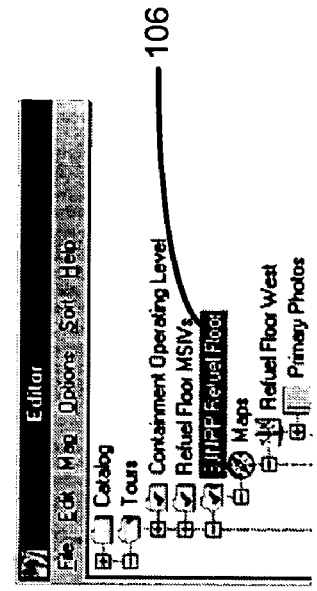
FIG. 16 illustrates one embodiment of an expanded directory tree containing a tour node.
Figure 13:
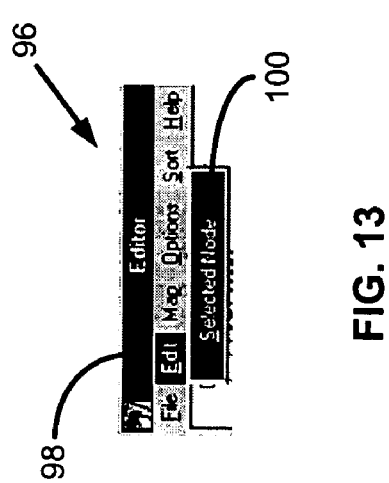
FIG. 13 illustrates one embodiment of a menu bar.
Figure 14:
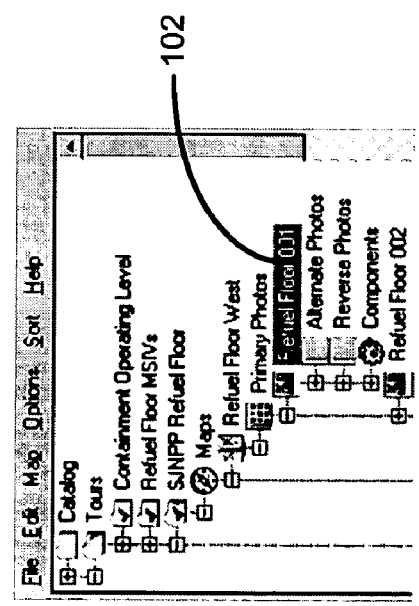
FIG. 14 illustrates one embodiment of an expanded directory tree containing an image node.

FIG. 13 illustrates one embodiment of a main menu bar 96 according to the present invention. Clicking on the edit option 98 of the menu bar 96 may display the selected node option 100. Clicking on the selected node option 100 then may display the editable information for the node that is selected in the tour tree 32. For example, with reference to FIG. 14, if the selected node is an image node 102 and an Edit/Selected Node 100 is clicked on, the information screen for that image is displayed and then may be edited. With reference now to FIG. 15, if the selected node is a map node 104 and Edit/Selected Node 100 is clicked on, the information screen for that map 62 is displayed and then may be edited. With reference to FIG. 16, if the selected node is tour node 106 and Edit/Selected Node 100 is clicked on, the information screen for that tour is displayed and may be edited. If a completed tour is being edited and is concurrently open in the viewer 16, the changes made in the editor 18 may not be seen in the viewer 16 until the viewer program has been exited and restarted, for example.

Referring to FIG. 17, the menu bar 96 may be found at one portion of the editor 18 screen 40. Clicking on the item or using the shortcut key combination of the "Alt" key with the underscored character in the menu item may be used to trigger selections, for example. There are five options to choose from on the menu bar 96. The File option 108 allows new tours to be created. It also may provide the means for exiting from the editor 18 program. The Edit option 98 allows information pertaining to the node selected in the tour tree 32 to be edited. The Map option 130 allows tour lines 70, tour points 72, and hyperlinks to be displayed or hidden, for example. The Options option 140 allows some of the editor settings to be modified. The Sort option 142 allows the thumbnail images 42A, B in the panels to be sorted by date or name. The Help option 116 provides several options for obtaining information desired by the user, and also helps in using the editor 18.

Illustrated in FIG. 18 is the resulting screen when the user clicks on the file option 108 in the menu bar 96. Clicking on the file option 108 on the menu bar 96 may display two or more choices, create a new tour 110 or exit 112 the editor 18, for example.

FIG. 19 shows embodiments of various pull down menu options that may be available by clicking the Help 116 option in the menu bar 96. When Help 116 is selected, the several options may be displayed to get help and information about the editor 18, such as the following options, for example. The editor "Overview" option 118 opens up the help system starting at an editor overview page. The editor's 18 "How To" option 120 opens up the help system starting at a how to index page. Selecting the "How to Use" Help option 122 opens up a WINDOWS® help system that describes how to use the help system. Selecting the "What's New" option 124 displays information that describes what is new in the latest release of the editor 18 that is running. Selecting the "About" option 126 displays the editor 18 program version and notes about copyrights. The "Copyrights" option 128 displays the credits for the editor 18 developments.

Turning now to FIG. 20, clicking on the "Map" option 130 on the menu bar 96 may display four options, for example. First, the "Show Tour Lines" option 132 displays the tour lines 70 on the map 62. Un-checking this option 132 hides the tour lines 70. Second, selecting the "Show Tour Points" option 134 displays the tour points 72 on the map 62. Tour points 72 are squares that indicate the location of primary images on the map 62. Un-checking option 134 hides the tour points 72. Third, selecting the "Show Current Tour Only" option 136 displays only the currently selected tour line 70 and its tour points 72, for example. Un-checking option 136 displays all the tours available on the map 62. Finally, selecting the "Show Hyperlinks" option 138 displays the map hyperlinks 172 (see FIG. 23) on the map 62. Un-checking this option 138 will hide the map hyperlinks 172 (see FIG. 23) on the map 62.

FIG. 21 illustrates one embodiment of the options 140 selection according to the present invention in slightly more detail. Clicking on the "Option" button on the Menu Bar 96 displays a list of properties that may be modified in the editor 18. The "History" option 144 determines how the history list 28 usage may be displayed. There are three options for the history list 28. A "Clear" option removes all entries from the history list 28, a "Size" option specifies the maximum number of entries in the history list 28, and a "Sort" option sorts the entries in the history list 28 alphabetically, for example. If it is unchecked, the entries may be listed in the order in which they were selected for viewing, for example. A "Thumbnail Hints" option 146 may provide hints by way of pop-up displays that appear when the cursor is moved over a thumbnail image 42A, B. The pop-ups may provide details regarding the file location, the height and width of the image, and the date and time the image was created, for example. The pop-ups may be turned on or off with option 146. A "Set Master Photo Catalog Folder" option 148 may be used to specify that all image files and map files for use by the editor 18 should reside under the same folder, namely the master image catalog 24 folder. The image files may be organized into sub-folders in any way desired. In one embodiment, however, the map files may be placed in a folder called Maps in the master image catalog 24. The location of the master image catalog 24 folder may be set with this option. An "Auto Load" option 150 provides that the thumbnail images 42 from the thumbnail tour viewer 30 and the thumbnail viewer directory 26 that were last displayed automatically load into the editor 18 upon start up. If the option is off, no thumbnail images 42 are displayed until a tour or image directory is selected. A "Reset Defaults" option 152 may be used to reset all window sizes, colors, and states back to the original default settings, for example. The "History List" is not affected when resetting defaults. A "Set Colors" option 154 allows the border color of the thumbnail images 42 to be changed, for example. The gradient of a thumbnail image color and which thumbnail images are affected (selected or unselected) may be customized with this option. The colors of the tour lines 70 and tour points 72 may be edited through an initialization file, for example.

As shown in FIG. 22, clicking on the "Sort" option 142 of the menu bar 96 displays the options for sorting the thumbnail images 42A present in the directory thumbnail viewer 26. If the "Directory Panel" button 156 is selected, the thumbnail images 42A may be sorted by Date 158 or by Name 160, for example, either in ascending 162 or in descending 164 order.

Figure 23:
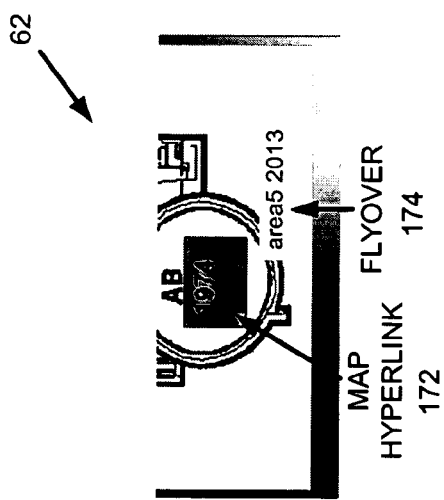
FIG. 23 illustrates one embodiment of a portion of a map containing a hyperlink therein.

FIG. 23 illustrates a portion of the map 62 according to one embodiment of the present invention containing a hyperlink therein. The map hyperlink 172 allows the user to travel from one map 62 to another by simply clicking on a specified area on the map 62. These areas on the maps 62 may display a new, larger map 62 of the area inside the map hyperlink 172 when clicked on. Multiple map hyperlinks 172 may be present on the map 62. A flyover 174, which contains the name of the map 62 may be displayed when the cursor is placed over the hyperlink 172. Flyovers 174 are bits of information that are displayed for a short time as the cursor passes over certain objects. In one embodiment of the present invention, flyovers may be made available for the thumbnail images 42A, B located in the directory thumbnail viewer 26, the tour thumbnail viewer 30, and the map panel 32. When the cursor is located on one of the thumbnail images 42A, B, the directory where the corresponding thumbnail image file is stored, its height and width, and the date and time of creation are displayed. Flyovers also may be made available for tour link arrows, component locators, and map hyperlinks, for example. When the cursor is placed over a tour link arrow, the name of the connecting tour may be displayed. When the cursor is over a component locator, the name of the component may be displayed.

Maps 62 are images that may be displayed in the map panel 32 portion of the editor 18. The maps 62 provide the user with the means to determine the location of each image associated with the tour. Arrows 68 may be placed on the maps 62 to pinpoint the exact location of an image. Any image that is cataloged in the editor 18 may be used for a map 62. In one embodiment of the present invention, all the images to be used as maps 62 for a tour may be placed in a common subdirectory of the master image catalog 24, for example.

Figure 24:
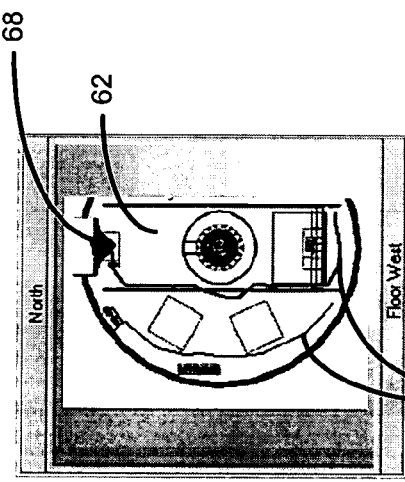
FIG. 24 illustrates one embodiment of a map containing tour lines.

FIG. 24 illustrates one embodiment of tour lines 70 according to the present invention. The tour lines 70 are the paths that may be drawn on the map 62 to indicate the location of the tours. The tour lines 70 may be created using primary images, for example. The tour lines 70 may be drawn between the tour points 72 of sequential images of the same tour. The tour lines 70 may be visible or hidden depending on the options selected from the menu bar 96 map 62 option 130. The color of the tour lines 70 also may be edited using an initialization file, for example. By default, a current tour may be shown in a different color than other tours on the map 62. This provides easy identification of the current tour and image location. In one embodiment of the present invention, the tour lines 70 and the tour points 72 may be associated with the primary images of a tour. When viewing the reverse images, however, the arrows 68 may not match with the tour line 70 or the tour point 72. The tour lines 70 and the tour paths may not change if reverse or alternate images are edited or added. Thus, when viewing the reverse images, the arrows 68 may be located where they had been originally placed, which may not be exactly along the tour line 70.

Figure 25:
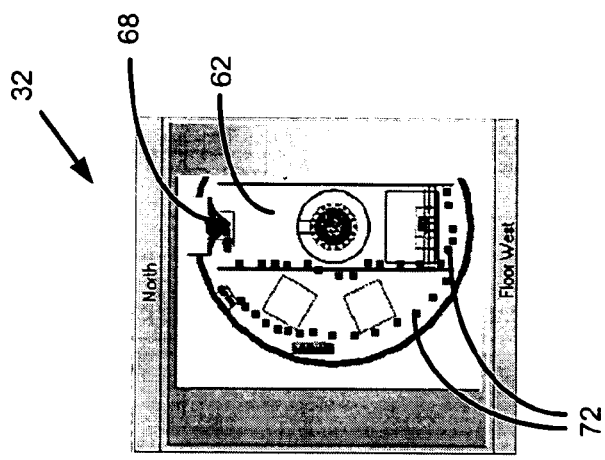
FIG. 25 illustrates one embodiment of a map containing tour points.

FIG. 25 illustrates one embodiment of the present invention where the tour points 72 may be displayed on the map 62 as images are added to a tour. The tour points 72 indicate the location of the primary image in the tour. The tour points 72 may be created when the primary image is added to a tour. Moving the arrow 68 on the map panel 32 or moving the arrow 68 when editing the primary image moves the tour points 72. The tour points 72 may be visible or hidden depending on the options selected from the menu bar 96 map option 130. The color of the tour points 72 also may be selected by editing the initialization file. By default, tour points 72 in a current tour may be shown in a different color than any other tour points 72 on different tours on the map 62. This provides easy identification of the current tour and image location. Tour points 72 may be created when an image is added to a tour, for example. Tour lines 70 and tour points 72 may be associated with the primary images of a tour, when viewing reverse images, the arrows 68 may not match with the tour line 70 or tour point 72. The tour lines 70 and tour paths will not change if reverse or alternate images are edited or added. Therefore, when viewing the reverse images, the arrows may be located where they have been placed, which may not be exactly along the tour line 70.

One example of the steps that may be used to create a map hyperlink 172 includes executing the following procedure.
1. Expand the tour tree 34 to display the maps node by clicking on the plus sign next to catalog, for example.
2. Click on the plus sign next to the maps node to display the list of map 62 names.
3. Click on the plus sign next to the map 62 name that the hyperlinks 172 will be created on.
4. With reference to FIG. 26, click on the words map links 180. If there are any hyperlinks 172 already created for a given map 62 they will generally be listed here.
5. Double click on the folder in the master image catalog 24 that contains the maps 62 that will be hyper-linked to. This displays the maps 62 in the directory thumbnail viewer 26.
6. Drag and drop the appropriate map 62 from the directory thumbnail viewer 26 to the tour thumbnail viewer 30.
7. With reference now to FIG. 27, the Edit Map hyperlinks window 190 will then be displayed.
8. Select the rectangle area 192 next to the arrow cursor 194 in the tool bar 196. The user then may click on the map 62 at the desired location of the hyperlink 172. A rectangle will be placed on the map 62. The rectangle represents the area of the map 62 that will be hyper-linked to.
9. To adjust the location of the rectangle, the user may move the mouse cursor over the rectangle, click and hold the left mouse button and drag the rectangle to a desired location.
10. To resize the rectangle, the user can move the mouse cursor over one of the squares (resizing handles) around the rectangle's border. When the cursor changes to a double arrow, the user may click and hold the left mouse button and drag the rectangle to the desired size.
11. To change the characteristics of the hyperlink rectangle 192, the user may place the mouse cursor on the rectangle 192 and then right click the mouse button to display a menu. Examples of the menu options are as follows.

Change Pen Color—allows selection of the color of the lines of the rectangle.

Change Pen Width—allows selection of the width of the lines as they appear on the map 62.

The Pen Width—may be set to 1 to enable the Change Pen Style option.

Change Pen Style—allows the lines to be drawn in different formats (dot, dot-dash, etc.).

Change Color—allows selection of fill color.

Change Transparency—displays the slider bar that determines the degree of transparency for the fill color.

Bring to Front—objects may be placed on the map 62 in layers. When objects are placed on top of another object so that the objects on the bottom layer are partially covered, right clicking on the bottom object and selecting Bring to Front will move the bottom object to the top layer to allow it to be moved or modified more easily.

Send to Back—objects may be placed on the map 62 in layers. Within each layer, when one object is placed on top of another so that the lower object cannot be clicked on to move or alter, right clicking on the top object and selecting Send to Back will move the top object to the bottom and allow the bottom object to move up a layer and to be modified or moved. Objects are generally moved within their own layer as described above.

Delete—will delete the hyperlink 172.

12. The user then may click on OK to accept any changes or may click on Cancel to exit the dialog box without creating the hyperlink 172. The hyperlink 172 may be displayed on the map 62 and the flyover 174 on the rectangle indicates the map 62 that will be hyper-linked.

13. Multiple hyperlinks 172 may be added by repeating this procedure.

As discussed previously, alternate images may include pictures that a user sees while looking left, right, up, and down virtually walking through the tour. Each alternate image may be associated with a primary image. With reference now to the screen 200 illustrated in FIG. 28, one example of the steps that can be used to add alternate images to a tour includes executing the following procedure.

1. Expand the tour tree 34 to display the alternate images node under the primary images it will be associated with. Click on the plus sign next to the primary images in the tour tree 34 then click on the plus sign next to the specific primary image that the alternate image will be associated with, for example. Click on the words alternate images to display the alternate image set up in the tour thumbnail viewer 30 on the right side of the screen 200.

2. Click on the plus sign next to the alternate images node in the tour tree 34 to expand the alternate selections. For each selected image there may be an up, down, left, and/or right image associated with it.

3. Select an image from the directory thumbnail viewer 26, drag it up into the tour thumbnail viewer 30, and drop it into the corresponding rectangle 202A, B. If it is an "up" image, drop it on the top rectangle 202A, if it is a "right" image, drop it on the rectangle 202B to the right of the alternate image, and so on. Alternate images are generally not assigned alternate views that are in the opposite direction. For example, an up alternate does not generally have a down option, because the down view from the up alternate is the original primary image.

4. Add a description, move the arrow to the correct location and click OK.

5. Continue adding alternate images as they become available. The tour lines 70 and tour points 72 generally represent primary images. The tour lines 70 do not change if reverse or alternate images are edited or added.

6. Click on the "X" 206 in the upper right corner of the tour thumbnail viewer 30 to move up one node on the tour tree 34. If an alternate image is displayed, it will close the alternate image window and return to the primary image window in the tour thumbnail viewer 30. If the tour thumbnail viewer 30 contains an alternate image of an alternate image, click on the "X" 206 to display the original alternate image, and so on.

7. The turn around arrow 208 may be used to navigate to the reverse image options of the same primary image. Clicking on the turn around arrow 208 a second time will navigate the user to the forward image.

In one embodiment, the present invention includes a GEDDS™ system, which is a WINDOWS®-based application that provides an easy to use and understand graphical user interface for the controlling and displaying radio transmitted electronic dosimetry data. GEDDS addresses the need for increased productivity and improved information management. GEDDS provides a high performance network solution for the management and display of data received from radio transmitting devices such as electronic dosimeters ARMs and CAMs.

With reference now to FIG. 29, real time dose rates from ARMs/CAMs also may be displayed on images in the editor 18 and viewer 16 if they are set up in the editor 18 and if the GEDDS module is currently running. One example of the steps that can be used to set up various ARMs/CAMs includes executing the following procedure.

1. Display the ARM/CAM by selecting a thumbnail image 42B from the tour thumbnail viewer 26.

2. Display the edit primary photo information form by right clicking on the thumbnail image 42B and selecting edit clicks on the "T" box 82 in the overlay toolbar 80.

3. Display a text box with handles (little boxes) around it by clicking in the image where the ARM/CAM information is to be located.

4. Select a link to arm or a link to cam by right clicking inside the text box. These steps cause a window 210 to pop up that enables the user to select the ARM/CAM(s) that may be available for monitoring. The user then may continue the process as follows.

5. Select the desired ARM/CAM 212 by clicking thereon; acknowledge the selection by clicking on OK 214. The text box will reflect the current dose rate and refresh with data from GEDDS at regular intervals.

6. To delete the ARM/CAM, the user may right click on the text box and select Delete from the options.

Any maps 62 that are to be used in the editor 18 may be placed in a directory located within the master image catalog 24 before they may be used to create tours. One example of the steps that may be used to add a map 62 to a tour includes executing the following procedure.

1. In the tour tree 34, select the tour that is to receive the map 62 by clicking on the word "Maps" and opening the map window in the tour thumbnail viewer 26.

2. Open and display the images in the directory thumbnail viewer 26 by double clicking on the folder that contains the map 62 image in the master image catalog 24.

3. Drag and drop the map 62 from the directory thumbnail viewer 26 into the tour thumbnail viewer 30.

Figure 30:
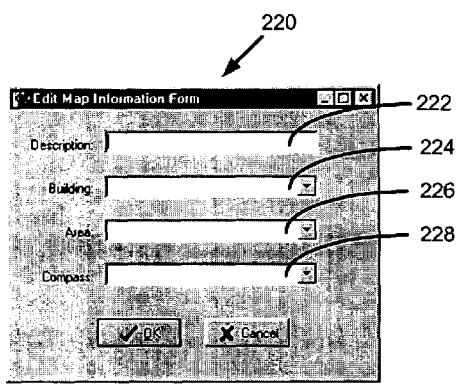
FIG. 30 illustrates one embodiment of an edit map information form screen.

4. With reference now to FIG. 30, if it is the first time the map 62 is being used in the editor 18, an edit map 62 information dialog box 220 may be displayed. The user then may continue by completing the descriptive information and entering information in the description box 222. If the map 62 has already been used in a tour, the map 62 information may be edited by right clicking on the map 62 in the tour thumbnail viewer 30 or by right clicking on the map file name in the tour tree 34 and selecting edit. The first time a map 62 is used in the editor 18, the Edit Map Information dialog box 220 may be displayed after adding it to a tour. Accordingly, the user may then enter the appropriate information in the Description 222, Building 224, Area 226, and Compass 228 fields as may be desired. In one embodiment of the present invention, the Description 222 field may be required before allowing the user to proceed. After completing these steps, the user may then click on OK to close the dialog box 220.

The maps 62 to be used in the editor 18 may be placed in the master image catalog 24. (The master image catalog 24 may be designated or edited from within the options 140 portion of on the menu bar 96.) Any thumbnail image 42A, B or image file in the master image catalog 24 may be used for a map 62. In one embodiment of the present invention, the map 62 images may be kept in a single subdirectory under the master image catalog 24, thus making them readily available and identifiable for the user to incorporate in a tour.

One example of the steps that may be used to add a map 62 to the editor 18 includes executing the following procedure.

1. Place the maps 62 in existing folders (e.g., the Maps folder) in the master image catalog 24 or create new directories within the master image catalog 24 and place the maps 62 in the new directories, thus making the maps 62 available for use in the editor 18. 2.
Display the maps 62 in the directory thumbnail viewer 26 by double clicking on the folder that contains the map files in the master image catalog 24.
3. Drag and drop the maps 62 into the tour thumbnail viewer 30 for use in a tour or to be cataloged for component use.
4. Automatically add the maps 62 to the master image catalog 24 when they are used for tours or with components.
5. Finally, display the maps 62 alphabetically in the Catalog/Maps portion of the tour tree 34.

Images to be added to an existing tour generally may be located in the master image catalog 24. One example of the steps that may be used to add an image to an existing tour includes executing the following procedure.

1. Select the tour to add an image to; expand the required folder by clicking on the plus next to the tour name in the tour tree 34; expand the Maps folder by clicking on the plus next to the Maps folder and expand the Map name folder by clicking on the plus next to the Map name.
2. Select the words, Primary Images by clicking on them, for example. This displays the images that are currently in the selected tour in the tour thumbnail viewer 26.
3. In the master image catalog 24, open the folder that contains the image file to be added to the tour by double clicking thereon and displaying the corresponding thumbnail images 42 within the folder in the directory thumbnail viewer 26; select the thumbnail image 42A to be added; and drag the thumbnail image 42A to the tour thumbnail viewer 30 to the location of the tour where it should be inserted and drop the thumbnail image 42A therein.
4. Accordingly, a new window opens containing the image, description, and direction fields where the user then may enter the appropriate information.
5. The map 62 and an arrow appear on the right side of the window; drag the arrow to the location on the map 62 that matches the location on the image; if the arrow requires rotation, either type the degree of rotation (1-360°) in the arrow angle field or move the slider bar until the arrow is at the proper angle; the arrow also can be moved horizontally by changing the value in the arrow X field or vertically by changing the value in the arrow Y field; finish by clicking on OK.

Figure 31:
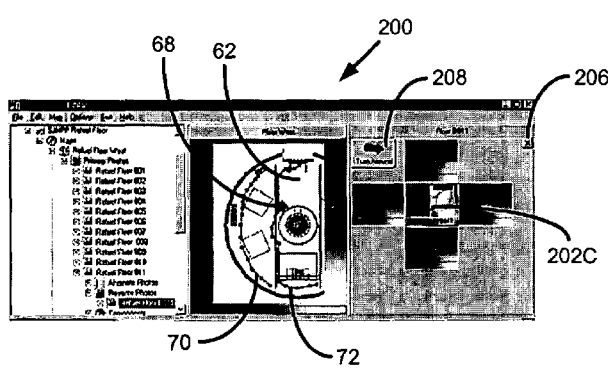
FIG. 31 illustrates one embodiment of another embodiment of a tour thumbnail viewer screen displaying an alternate image set up.

With reference now to FIG. 31, one example of the steps that may be used to associate a reverse image to a primary image includes executing the following procedure.

1. Display the reverse image node under the primary image to which it will be linked to expand the tour tree 34, by clicking on the plus sign next to primary photos in the tour tree 34, then clicking on the plus sign next to the specific primary image that the reverse image will be linked to and clicking on the words reverse photos to display the reverse image set up in the tour thumbnail viewer on the right side of the screen.
2. Expand the alternate selections by clicking on the plus sign next to the reverse photos node and for each reverse image there may be an up, down, left and/or right image linked to it.
3. Select a thumbnail image 42A from the directory thumbnail viewer 26, drag the thumbnail image 42A to the tour thumbnail viewer 30, and drop it into the center rectangle 202C; add a description, move the arrow 68 to the correct location on the map 62, and click on OK. In one embodiment of the present invention, the tour lines 70 and tour points 72 may only represent the primary images. The tour lines 70 and tour paths may not change if reverse or alternate images are edited or added. Accordingly, when viewing the reverse images, the arrows may be located where they were originally placed and may not coincide with the tour line 70.
4. Close the reverse image window by clicking on the "X" 206 in the upper right corner of the tour thumbnail viewer 200 and return to the primary image window in the tour thumbnail viewer 30.
5. Use the turn around arrow 208 to navigate to the forward image options for the reverse image.

Text also may be added to an image. One example of the steps that may be used to add text to an image includes executing the following procedure.

1. Locate the tour image that will contain the text note and display it in the tour thumbnail viewer 30 by clicking on it.
2. Display the edit image information form for that image by either (1) right clicking on the image file name in the tour tree 34 and selecting Edit, or (2) right clicking on the thumbnail image 42B in the tour thumbnail viewer 30 and selecting Edit.
3. Click on the box 80 with a "T" 82 in it at the top left of the window.
4. Click on the area of the image where the text will be placed and a text box will be displayed with eight handles (tiny squares) around it.
5. Move the cursor over the text box until it changes into a hand to move the text box to another location, click and hold the left mouse button and drag the text box to the desired location.
6. Display the Edit Text Form by right clicking on the text box and selecting Enter Text from the options, enter the text (up to 50 characters) in the text field.

If necessary, the characteristics of the text may be altered by right clicking on the text box and selecting one or more of the following options:

Link to ARM—may display a list of ARMs available to link to. If a text box is linked to an ARM, the text box automatically reflects the update of the dose reading from the ARM, as long as the link is maintained. When a tour is used that contains this link, the data may be updated at regular intervals and may be displayed on the image that contains the text box;

Link to CAM—may display a list of CAMs available to link to. If a text box is linked to a CAM, the text box may automatically reflect the update of the dose reading from the CAM, as long as the link is maintained. Any time a tour is used that contains this link, the data may be updated at regular intervals and may be displayed on the image that contains the text box.

Text Font—may allow selection of the text font;

Change Color—may allow selection of the color of the text box;

Change Text Color—may allow selection of the color of the text as it appears on the image;

Change Handles—may allow the handles around the text box to appear as a solid squares or clear (the background shows through);

Bring to Front—objects may be placed on the image in layers in the order in which they are created. Sometimes objects may be placed on top of another object so that the objects on the bottom layer are partially covered. Right clicking on the bottom object and selecting Bring to Front will move the bottom object to the top layer to allow it to be moved or modified more easily;

Send to Back—objects may be placed on the image in layers in the order in which they are created. One object may be placed on top of another so that the object on the bottom layer cannot be clicked on to move or alter. Right clicking on the top object and selecting Send to Back will move the top object to the bottom layer and allow the bottom object to move up a layer and to be modified or moved; and Delete—this will delete the selected text box Links may be provided between tours. A minimum of two tours may be required, however, before the tours may be linked together. To provide continuity between tours, a user generally may create a link from Tour B to Tour A at the time when the link from Tour A to Tour B is created. A tour may have multiple links and multiple links may be created on a single image. One example of the steps that may be used to link two tours (e.g., Tour A and Tour B) includes executing the following procedure.

1. Locate a tour image to link from Tour A in the tour tree 34 and display it in the tour thumbnail viewer 30 by clicking on it.
2. Display the Edit Photo Information Form for that image by either (1) right clicking on the image name in the tour tree and selecting Edit, (2) right clicking on the image in the tour thumbnail viewer 30 and selecting Edit, or (3) select the image and use the menu bar 96.
3. Click on the green arrow button at the top left of the window.
4. Click on the area of the image where the arrow will be placed, the arrow will be displayed with eight handles (squares) around it.
5. Move the cursor over the arrow until it changes into a hand to move the arrow to another location, click and hold the left mouse button and drag the arrow to the desired location (the arrow may be rotated, see step below).
6. Select Link to Tour from the options by right clicking on the arrow to display the Select Tour Link Form and navigate through the tour tree 34 to locate the image that will be linked to in Tour B. Accordingly, the image located is the image displayed when the arrow is clicked on from Tour A. It will be the first image of Tour B (the linked tour). For example, to link a tour of the kitchen (Tour A) and a tour of the dining room (Tour B), an arrow may be placed on the image at the doorway in the kitchen and linked to the image at the doorway in the dining room. When taking a tour of the kitchen, if the arrow is clicked on, the user will be taken to the doorway of the dining room.

7. The description entered in the Tour Link Form is the text that is displayed in the flyover 174 help in the tour. This is the information box that is displayed when the cursor moves over the arrow on the image in the tour.

Characteristics of the arrow may be altered by right clicking on the arrow and selecting one of the following:

Center Rotation—may allow the rotation of the arrow to originate from the center point of the arrow;

Tip Rotation—may allow the rotation of the arrow to originate from the tip of the arrow;

Rotate—displays the arrow angle and slider bar that allows the arrow to be rotated;

Change Handles—may allow the handles around the arrow to appear as a solid squares or clear (the background shows through);

Bring to Front—objects may be placed on the image in layers in the order in which they are created. Sometimes objects may be placed on top of another object so that the objects on the bottom layer are partially covered. Right clicking on the bottom object and selecting Bring to Front will move the bottom object to the top layer to allow it to be moved or modified more easily;

Send to Back—objects may be placed on the image in layers in the order in which they are created. One object may be placed on top of another so that the object on the bottom layer cannot be clicked on to move or alter. Right clicking on the top object and selecting Send to Back moves the top object to the bottom layer and allow the bottom object to move up one layer and to be modified or moved; and Delete—this may be used to delete the selected arrow.

New components may be associated with an image in a tour. Components may be cataloged prior to being associated with an image in a tour in the editor 18. Cataloged components may be images that contain more detail of the component than the image that is being used in a given tour. One example of the steps that may be used to catalog a new component includes executing the following procedure.

Figure 32:
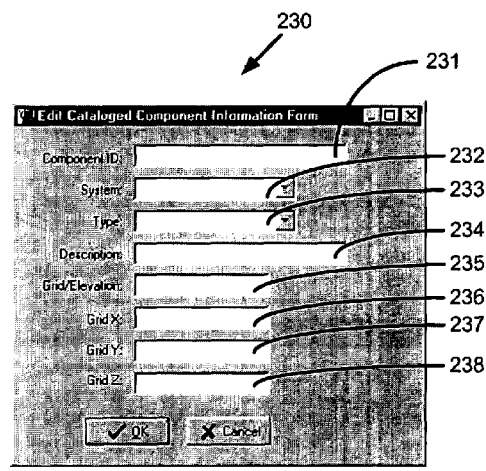
FIG. 32 illustrates one embodiment of an edit cataloged component information form screen.

1. Display the Components node by clicking on the plus sign next to Catalog and expanding the tour tree 34.
2. Display the By Map node by clicking on the plus sign next to Components.
3. Display the map 62 names that may be available for component locations by clicking on the plus sign next to By Map.
4. Display the available maps 62 in the tour thumbnail viewer 30 by clicking on the words By Map.
5. Select the appropriate map 62 by either clicking on the map file name in the tour tree 34 or by selecting it in the tour thumbnail viewer 26. If the desired map 62 is not cataloged under the Components node, it may need to be cataloged before components can be added to it.
6. Display the options menu. Select Add New Component by right clicking on the map 62 name in the tour tree 34.
7. Display the Edit Cataloged Component Information Form 230 as illustrated in FIG. 32. The user now has the option of entering the Component ID 231, the System 232, the Type 233, the Description 234, the Grid/Elevation 235, the Grid-X coordinate 236, the Grid-Y coordinate 237 and the Grid-Z coordinate 238.
8. Add the descriptive information. Click on OK. Accordingly, the component name may be added to the tour tree 34 under the selected map 62. Information related to this component may be accessed and edited at any time by right clicking on the component in the tour tree 34 and selecting Edit. If there are multiple views of a component, the image may be the first one to be displayed when selected. It is indicated by a gear symbol and is the component node in the tour tree. A specific component image may be associated with this descriptive information. Also, multiple views of the same component with the same descriptive information (as displayed above) may be added.

9. To associate a specific component with the component node just created, select the folder from the master image catalog 24 that contains the component image by double clicking on it to display the image files contained in that folder in the directory thumbnail viewer 26.

10. Verify that the component name was selected in the tour tree 34.

Figure 33:
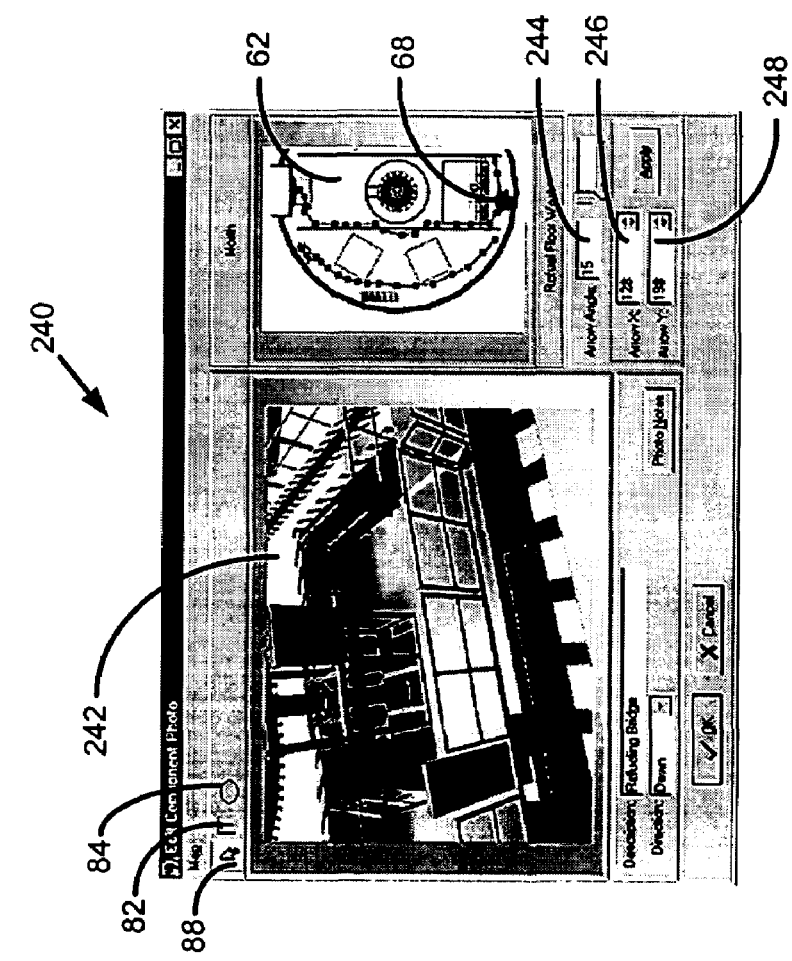
FIG. 33 illustrates one embodiment of an edit component image screen.

11. Select the image of the component from the directory thumbnail viewer 26, drag and drop it in the tour thumbnail viewer 30. Accordingly as illustrated in FIG. 33, the Edit Component Photo form 240 is displayed. The information is specific to each component image 242. If there are multiple views of a component image 242, each view may have its own information that may be edited from the edit component photo form 230. On the right side of the window may be the map 62 and an arrow 68. If the arrow 68 requires rotation, the user may type either the degree of rotation (1-360°) in the arrow angle field 244 or may move the slider bar until the arrow is at the proper angle; the arrow also may be moved horizontally by changing the value in the arrow X field 246 or vertically by changing the value in the arrow Y field 248; finish by clicking on OK.

12. Fill in the descriptive information and place the arrow in the correct location and click on OK.

13. Add multiple views of a component by selecting the component in the tour tree 34 (with the gear symbol next to it) and dragging and dropping the alternate views into the tour thumbnail viewer 30.

If a component has more than one image associated with it, these images may be repositioned within the tour thumbnail viewer 30 as follows: move the cursor over the image to be moved, the cursor may be shaped like a hand to indicate that the image may be dragged to another location; click and hold down the mouse button, then drag and drop the image to the desired location in the tour thumbnail viewer; as the image is dragged in the tour thumbnail viewer, a placement bar may be highlighted to indicate the image may be dropped to the left of the placement bar; and place the image before or after any other image in the tour thumbnail viewer 30. Cataloged Components also may be moved within the same component node in the tour tree 34. If a component has multiple views, they may be repositioned within the component node by selecting, dragging, and dropping the components in the tour tree.

Figure 34:
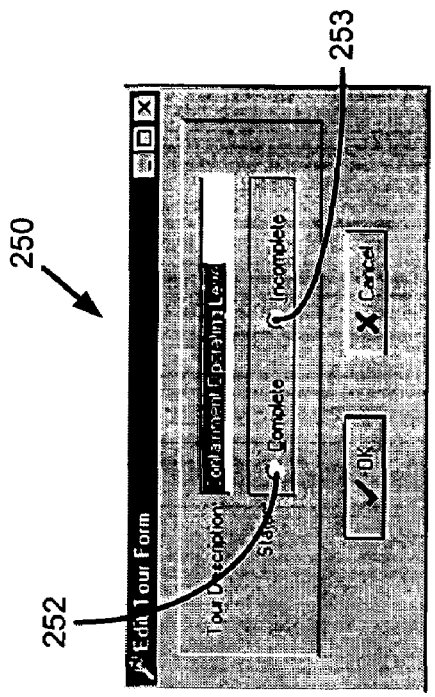
FIG. 34 illustrates one embodiment of an edit tour form screen.
Figure 35:
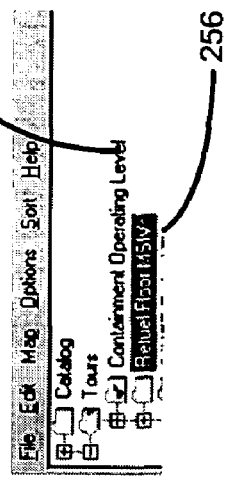
FIG. 35 illustrates one embodiment of a current status of a folder icon containing either a complete status or an incomplete status.

The tour status also may be changed, at any time, in one of two ways, for example. First, by right clicking on the tour name in the tour tree and selecting Change Status. Second, with the name of the tour highlighted in the tour tree, selecting Edit 98 Selected Node 100 from the menu bar 96. This action displays the Edit Tour Form 250 as illustrated in FIG. 34. The Edit Tour Form 250 allows the user to enter information for a new or an existing tour. A Complete status 252 on a tour means that the tour is available to the viewer 16 program and is indicated by a red check mark next to the tour in the tour tree 34. If a tour is not marked as complete it may not be available for viewing in the viewer 18. The tour tree 34 indicates the current status in its folder icon. A complete status 252 has, for example, a red check in the folder. An incomplete status 253 has, for example, no check mark. In the example illustrated in FIG. 35, the "Containment Operating Level" 254 is complete, while the "Refuel Floor MSIVs" 256 is not.

Certain elements of a tour are now described. Tours may be created quickly and easily if the images and maps 62 are organized in directories before starting, for example. A tour may include, for example:

Maps—to identify the location of the image and arrows may be used to display the location and direction of the image.

Arrows—to identify the location and direction of the image on the map 62.

Primary Photos—images used in sequence to create a virtual tour of a location.

Alternate Photos—images used in conjunction with the Primary Photos. These are images that would be seen in the right, left, up or down direction while standing in the position of the Primary image.

Reverse Photos—images used in conjunction with the Primary Photos. These are the images that are 180° from the direction of the Primary Photo.

Components—images in a tour may contain components that may be viewed in greater detail. Locators may be placed around these components to identify them. When the mouse is clicked while the cursor is inside the locator, a more detailed image of the component may be displayed.

One example of the steps that may be used to create a new tour includes executing the following procedure.

1. On the menu bar 96, click on File 108 and select New Tour 110 and a dialog box is displayed. (This dialog box may be accessed at any time by either right clicking on the Tour Name and selecting Edit, or by selecting the Tour Name and from the Menu Bar, selecting Edit, Selected Node).

2. Enter a description including defaults to make tours available for viewing in the viewer 18 when they are marked as complete, which is indicated by a check mark next to the tour on the tour tree 34 and the new tour name appears in the tour tree.

3. Select the Map node in the tour tree 34 by clicking on it, double click on the Maps folder in the master image catalog in the Catalog Panel of the Editor located in the lower left corner to display the available map files in the directory thumbnail viewer 26.

4. In the directory thumbnail viewer 26, move the cursor over the map 62 to be selected for the tour, click and hold the mouse button, drag and drop the map 62 into the tour thumbnail viewer 26 to display the selected map 62. Multiple maps 62 may be placed into the tour thumbnail viewer 26 following the same steps. Maps 62 may be selected in the tour thumbnail viewer 30 by clicking on them. Selected items may be highlighted in green.

5. Click on the plus box next to the map 62 name in the tour tree and if there are multiple maps 62 in the tour, select the map 62 which may display the location for the first image; and select Primary Photos in the tour tree 34, located beneath the map 62 that was previously selected. The primary images should now be highlighted.

6. Double click on the folder in the master image catalog 24 that contains the images for the new tour to display the images that may be contained in that folder in the directory thumbnail viewer 26 and select the first image to be used in the tour by moving the cursor over it, click and hold the mouse button, and drag and drop the image into the tour thumbnail viewer 30.

7. When a new window opens containing the image along with the description and direction fields, enter the appropriate information.
8. The map 62 and an arrow may be displayed on the right side of the window. Drag the arrow to the location on the map 62 that matches the location of the image. If the arrow requires rotation, either type the degree of rotation (1-360°) in the Arrow Angle field or move the slider bar until the arrow is at the proper angle. The Page Up and Page Down keys move the arrow angle by 90°. The arrow keys change the angle of the arrow by one degree up or down. The arrow also may be moved horizontally by changing the value in the Arrow X field or vertically by changing the value in the Arrow Y field. Overlays also may be added at this time. When finished, click on OK. Further, if the slider is selected, the arrow keys on the keyboard move the arrow by one degree up or down. The Page Up and Page Down keys move the arrow by 90°. If the Arrow X or Arrow Y field is selected, the up and down arrows on the keyboard increase or decrease the value in this field in increments of one.
9. Continue placing images in the tour thumbnail viewer 30 until the tour is complete; right click on the tour name in the tour tree and select Change Status Complete. This allows the tour to be viewed in the viewer 16. If any changes to the tour are required after viewing, change the status back to Incomplete and make the changes.

In order for the completed tour to loop in the viewer 16 (i.e., allow the user to travel on a continual path, turn around at the end of the forward images, travel back through the tour in the reverse direction, and then start over again with the first forward image), each forward image may include a reverse image linked to it. If no reverse image exists, duplicate reverse images may be used. The editor's 18 sample database (which may not necessarily be available to individual users), also supplies an image, which may be inserted wherever the reverse image is not available.

Information about a map 62 may be edited when the map 62 is cataloged for the first time. It also may be edited at any time by right clicking on the map 62 name in the tour tree 34 or by right clicking on the map 62 in the tour thumbnail viewer 30 and, in either case, selecting Edit. With reference back to FIG. 30, a form 220 is displayed. When the map 62 is used for the first time in the editor 18 or when it is edited, a Description 222 of the map 62 may be required. Information for the Building 224, Area 226, and Compass 228 fields may be typed in or selected from existing choices by clicking on the drop-down arrows and selecting the choice. Selecting OK saves the information while selecting Cancel closes without saving.

Figure 36:
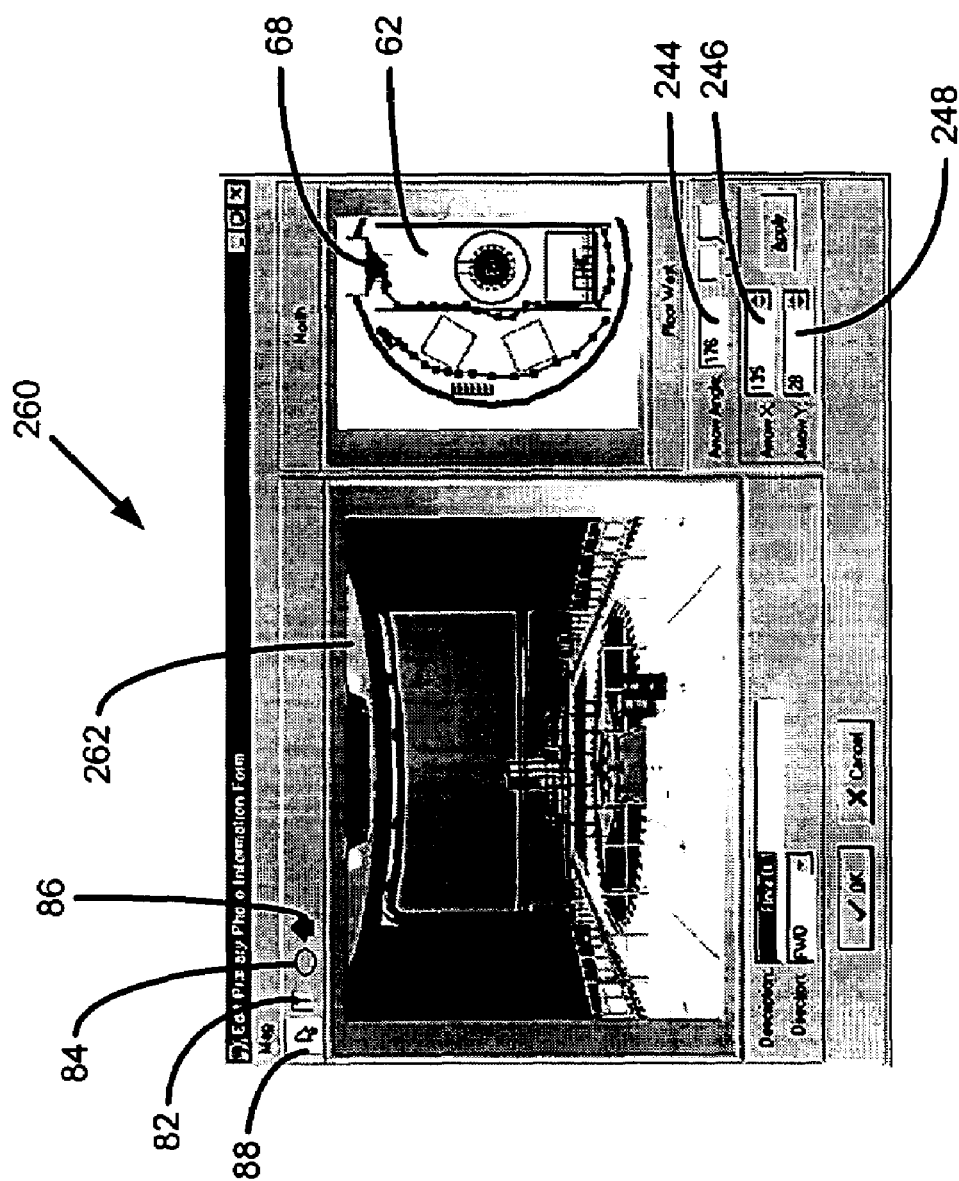
FIG. 36 illustrates one embodiment of an edit primary image information form screen.

With reference now to FIG. 36, while information about an image 262 may generally be entered when the image 262 is placed in a tour, such information also may be edited at any time by right clicking on the image file name in the tour tree 34 or by right clicking on the thumbnail image 42B in the tour thumbnail viewer 30 and, in either case, selecting Edit. Accordingly, the Edit Primary Photo Information screen 260 appears. The user then completes any changes that are required and may click OK to save the changes or may click on Cancel to exit the Edit screen 260 without saving changes. Overlays may be added from the overlay toolbar, the map 62 arrow may be adjusted, and the description and direction may be edited.

Several different color properties may be available and may be edited for the tour lines and the tour points. These properties may be edited in the editor's 18 initialization file under the Color section. A first key word value may determine the color of the currently selected tour line. A second key word value may determine the color of all the other tour lines. A third key word value may determine the color of the tour point of the currently selected tour line. A fourth key word value may determine the color of tour points in the non-selected tours. A fifth key word value may determine the color of the border around each tour point of the currently selected tour. Finally, a sixth key word value may determine the color of the border around the tour points in the non-selected tours.

In one embodiment of the present invention, components may be linked to a tour after they are cataloged. Cataloged components are images that contain more detail of the component than the image that is being used in the current tour. Once an image has been added to a tour, a cataloged component may be linked to it. Accordingly, a locator may be placed around the component on the tour image. When the cursor is moved over the locator, the cursor may change to a hand, for example. If the user clicks on the component in the locator, the cataloged component image may be displayed. Right clicking inside the locator displays the option "Show Notes." If notes are available for the component within the locator, they may be displayed when Show Notes is selected. One image may contain multiple component links but each locator may be linked only to one component.

One example of the steps that may be used to link a component to an image in a tour includes executing the following procedure:

1. Locate the tour image in the tour tree that contains the component. Display it in the tour thumbnail viewer by clicking on it.
2. Display the Edit Photo Information Form by either (1) right clicking on the image name in the tour tree and selecting Edit, or (2) right clicking on the image in the tour thumbnail viewer and selecting Edit.
3. Click on the red elliptically shaped button at the top left side of the window.
4. Click on the area of the image where the locator will be placed. An ellipse will be displayed with eight handles (tiny squares) around it. These handles are used to resize the ellipse to the size and shape that will encircle the component.
5. To change the shape of the ellipse, move the cursor over one of the handles until it changes to a double arrow. Click and hold the left mouse button and drag the cursor to change the shape of the ellipse. Any of the handles may be used to change the shape of the ellipse.
6. To move the ellipse to another location, move the cursor over the ellipse until it changes into a hand. Click and hold the left mouse button. Drag the ellipse to the desired location.
7. Right click on the locator and select Link to Component from the options. This displays the Select Component Form. Click on the drop-down arrow to display the list of components that have been cataloged and select the component. This is the image that is displayed when the locator is clicked on during a tour.

Characteristics of the locator may be altered by right clicking on the locator and selecting one or more of the following:

Change color—may allow the selection of the color of the locator;

Change type—may allow the selection of the shape of the locator;

Change Pen Width—may allow the selection of the width of the line that is used, "1" being the thinnest and "5" being the thickest;

Change Pen Style—may allow selection of the type of line used, i.e., dashes, dots, solid, etc. This may be available as an option when the Pen Width is set at "1";

Change Handles—may allow the handles of the locator to appear as a solid square or clear (the background shows through);

Bring to Front—objects may be placed on the image in layers in the order in which they are created. Sometimes objects may be placed on top of another object so that the objects on the bottom layer are partially covered. Right clicking on the bottom object and selecting Bring to Front will move the bottom object to the top layer to allow it to be moved or modified more easily;

Send to Back—objects may be placed on the image in layers in the order in which they are created. Sometimes one object may be placed on top of another so that the object on the bottom layer cannot be clicked on to move or alter. Right clicking on the top object and selecting Send to Back moves the top object to the bottom layer and allows the bottom object to move up a layer and to be modified or moved; and Delete—this may be used to delete the selected locator.

According to one embodiment of the present invention, the editor 18 may include certain security features. For example, one embodiment of the editor 18 may include a security designation for each asset such as, for example, each tour, picture, map, and component cataloged in the system. The editor 18, for example, may enable the assignment of a single or multiple level security designation for each tout, picture, map, and component cataloged in the system. The assigned security designation may be a two-level security designation, for example. In one embodiment of the present invention, when the user is running the editor 18, the assigned security designation of each asset may be compared to an authorization of the user to determine whether or not the asset is displayed.

Figure 37:
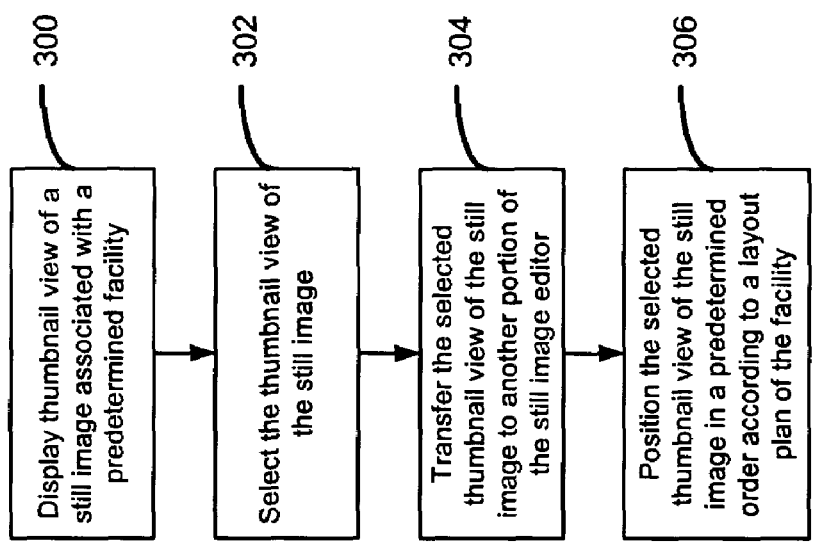
FIG. 37 illustrates a process flow diagram of a method of editing portions of an interactive image video tour according to one embodiment of the present invention.

FIG. 37 illustrates a process flow diagram of a method of editing portions of an interactive image video tour according to one embodiment of the present invention. The process may initiate at block 300 where the visual tour program interface, via the tour thumbnail viewer 30, displays a thumbnail view of an image associated with a predetermined facility in a first portion of the editor 18, such as for example, the directory panel 20. The image being stored in the database 14 in the form of a data file comprising image data. At block 302, the thumbnail view of the image may be selected from the database 14. At block 304, the selected thumbnail view of the image is transferred to a second portion of the editor 18, such as for example the tour panel 22. At block 306, the selected thumbnail view of the image may be positioned in a predetermined order according to a tour layout plan of the predetermined facility within the second portion of the editor 18, the predetermined order corresponding to a position of the image within the tour layout of an interactive image video tour of the predetermined facility.

A directory of the image may be displayed in the first portion of the editor 18. The directory may include a hierarchical representation of folders for organizing a plurality of images into separate groups. A tour map 62 corresponding to the thumbnail view of the image may be provided contained in the second portion of the editor 18 for identifying a location of the image within the interactive image video tour. Alternate images to the interactive image video tour may be provided for achieving any of an up, down, left or right view of a selected image within the interactive image video tour. The alternate images may be linked to any other image associated with the interactive image video tour. Arrows may be provided to the interactive image video tour. In one embodiment of the present invention, the arrows may be provided on a tour map for identifying a location of the image within the interactive image video tour. In another embodiment of the present invention, the arrows may be provided on a tour map for identifying links associated with other interactive image video tours.

Several overlays in any combination may be provided to the image video tour. Examples of overlays include a component overlay, which may be linked to another interactive image video tour, for example, an ARM overlay, and/or a CAM overlay. Other functions may be incorporated within the interactive image video tour such as directional paths, hyperlinks for traveling from one tour map to another tour map, tour lines in a tour map for indicating a location of the image within the interactive image video tour, and tour points in a tour map 62 for indicating a location of the image within the interactive image video tour.

Primary images may be provided to the interactive image video tour where each of the primary images may include a plurality of alternate images referenced thereto. In one embodiment of the present invention, the arrow positions may be coordinated to the primary image for coordinating the position of the plurality of alternative images referencing the primary image. Further, in one embodiment of the present invention the coordinating arrows associated with the coordinating arrow positions may be auto-positioned and rotated when adding the alternate images to the image video tour.

A tour map associated with one interactive image video tour may be designated as a site plan for a plurality of interactive image video tours and a hyperlink from the tour map of the one interactive video tour may be provided to tour maps associated with other interactive image video tours.

Components may be provided to the interactive image video tour where the components may include images having greater detail than the images within the interactive image video tour. In one embodiment, the capabilities of the components associated with the interactive image video tour may be cataloged. Further, in one embodiment of the present invention, the components may be searched according to any of a component identification, system or type.

Figure 38:
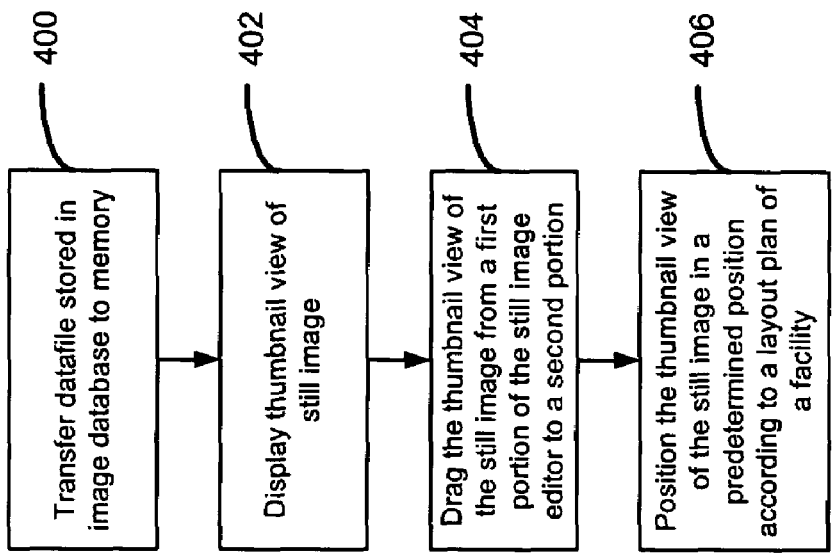
FIG. 38 illustrates a process flow diagram of a method of creating and editing portions of an interactive image video tour.

FIG. 38 illustrates a process flow diagram of a method of creating and editing portions of an interactive image video tour. At block 400, a data file stored in the image database 14 may be transferred to a memory of a computer. The image database 14 may contain a plurality of data files representing a plurality of images associated with an interactive image video tour of a predetermined facility and each of the pluralities of data files may include image data for displaying an image associated with a portion of the predetermined facility on a viewer associated with the computer. At block 402, a thumbnail view of the image may be displayed in a first portion of the editor 18 such as a directory panel 20. At block 404, the thumbnail view of the image may be dragged from the first portion of the editor 18 to a second portion of the editor 18 such as the tour panel 22. At block 406 the thumbnail view of the image may be positioned in a predetermined position according to a tour layout plan of the predetermined facility in the second portion of the image editor. At block 408 the image selected for use in the interactive image video tour of the predetermined facility may be displayed in the second portion of the image editor.

Figure 39:
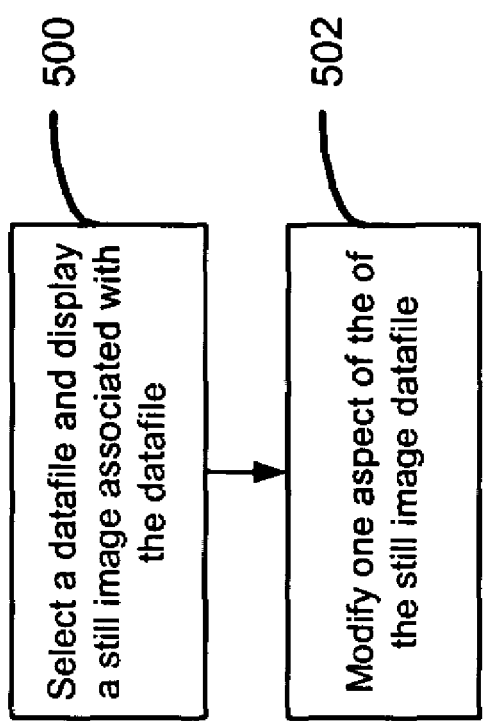
FIG. 39 illustrates a process flow diagram of a method of editing portions of an interactive image video tour according to one embodiment of the present invention.

FIG. 39 illustrates a process flow diagram of a method of editing portions of an interactive image video tour according to one embodiment of the present invention. At block 500, a data file comprising image data may be selected and an image associated therewith may be displayed on a display terminal of a computer. The data file may be stored in the image database 14 and may contain a plurality of images for creating an interactive image video tour of a predetermined facility. At block 502 one aspect of the image data contained in the selected data file may be modified.

While several embodiments of the invention have been described, it should be apparent, however, that various modifications, alterations, and adaptations to those embodiments may occur to persons skilled in the art with the attainment of some or all of the advantages of the present invention. The above description, therefore, is intended to cover all such modifications, alterations, and adaptations without departing from the scope of the present invention as defined by the appended claims.

What is claimed is:

1. A computer system for editing an interactive image video tour, comprising:
 a computer including an image editor providing a visual program interface for editing an interactive image video tour associated with a predetermined facility;
 a database in communication with the computer containing data associated with a plurality of images associated with the predetermined facility comprising a portion of the interactive image video tour; and
 a viewer in communication with the computer for displaying the plurality of images of the predetermined facility for enabling a user to view a virtual interactive tour of the predetermined facility;
 wherein the image editor further comprises a directory panel; and
 wherein the directory panel further comprises a module for displaying a history list of directories containing the plurality of images selected while creating the interactive image video tour.

2. The computer system of claim 1, wherein the image editor provides a visual program interface for creating an interactive image video tour with the plurality of images contained in the database.

3. The computer system of claim 1, wherein the directory panel further comprises a module for displaying a directory list of the plurality of images accessible by the image editor, the directory providing a hierarchical representation of folders for organizing the plurality of images into separate groups.

4. A computer system for editing an interactive image video tour, comprising:
 a computer including an image editor providing a visual program interface for editing an interactive image video tour associated with a predetermined facility;
 a database in communication with the computer containing data associated with a plurality of images associated with the predetermined facility comprising a portion of the interactive image video tour; and
 a viewer in communication with the computer for displaying the plurality of images of the predetermined facility for enabling a user to view a virtual interactive tour of the predetermined facility;
 wherein the image editor further comprises a tour panel; and
 wherein the tour panel further comprises a tour thumbnail image viewer for displaying the plurality of images that have been selected for the interactive image video tour.

5. The computer system of claim 4, wherein the tour panel further comprises a map panel for identifying a location of the plurality of images within the interactive image video tour.

6. The computer system of claim 4, wherein the tour panel further comprises a tour tree for displaying a hierarchical outline view of the interactive image video tour.

* * * * *